(12) United States Patent
Yahagi

(10) Patent No.: US 7,630,720 B2
(45) Date of Patent: *Dec. 8, 2009

(54) CONTENT DISTRIBUTION SYSTEM, NETWORK, AND CHANNEL SWITCHING CONTROL METHOD

(75) Inventor: Masahiko Yahagi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/243,895

(22) Filed: Oct. 1, 2008

(65) Prior Publication Data

US 2009/0036140 A1 Feb. 5, 2009

Related U.S. Application Data

(63) Continuation of application No. 10/541,797, filed as application No. PCT/JP03/16980 on Dec. 26, 2003.

(30) Foreign Application Priority Data

Jan. 10, 2003 (JP) ............................. 2003-003810

(51) Int. Cl.
*H04W 72/00* (2006.01)
(52) U.S. Cl. .................. 455/450; 455/522; 455/560; 455/509; 370/318; 370/329
(58) Field of Classification Search ......... 455/450–453, 455/509, 517, 522, 69, 560–561, 513, 436–442; 370/318–322, 326–329, 335–345, 348
See application file for complete search history.

(56) References Cited

U.S. PATENT DOCUMENTS 5,077,828 A 12/1991 Waldroup 6,272,124 B1 8/2001 Ahn et al.

(Continued)

FOREIGN PATENT DOCUMENTS

JP 05-328428 A 12/1993

(Continued)

OTHER PUBLICATIONS

3GPP TR 23.846 6.0.0, Oct. 2.

*Primary Examiner*—Kamran Afshar
(74) *Attorney, Agent, or Firm*—Sughrue Mion, PLLC

(57) ABSTRACT

A content distribution system uses a PtP (point to point) channel (individual channel) or PtM (point to multi-point) channel (common channel) as a radio channel of a predetermined type so as to distribute a broadcast content as communication data to a user terminal as a mobile station. The user terminal receives the same content distributed from a broadcast content server by the PtP channel. Here, if the total of the downlink transmission power of the PtP channel is greater than the downlink transmission power of the PtM channel when the content is distributed to the user terminal by the single PtM channel, a base station or a base station control device judges that the radio channel is to be switched from the PtP channel to the PtM channel. Similar judgment is made when switching from the PtM channel to the PtP channel is performed. Thus, it is possible to switch the radio channel type used for the broadcast-type service without lowering the use effect of the radio resources.

25 Claims, 31 Drawing Sheets

U.S. PATENT DOCUMENTS

| | | | |
|---|---|---|---|
| 6,507,567 B1 * | 1/2003 | Willars | 370/321 |
| 6,594,241 B1 | 7/2003 | Malmlöf | |
| 6,594,501 B2 | 7/2003 | Black et al. | |
| 6,708,042 B1 | 3/2004 | Hayakawa | |
| 6,847,828 B2 | 1/2005 | Miyoshi et al. | |
| 6,907,250 B2 | 6/2005 | Ishikawa et al. | |
| 6,934,556 B2 | 8/2005 | Takano | |
| 7,088,960 B2 * | 8/2006 | Kato et al. | 455/69 |
| 7,277,694 B2 | 10/2007 | Sinnarajah et al. | |
| 7,519,369 B2 * | 4/2009 | Yahagi | 455/450 |
| 2002/0094833 A1 | 7/2002 | Lieshout et al. | |
| 2002/0114295 A1 | 8/2002 | Takahiro et al. | |
| 2002/0119798 A1 | 8/2002 | Hamabe | |
| 2002/0160781 A1 | 10/2002 | Bark et al. | |
| 2003/0114167 A1 | 6/2003 | Chen et al. | |
| 2004/0038702 A1 * | 2/2004 | Okawa et al. | 455/522 |
| 2004/0116125 A1 | 6/2004 | Terry | |
| 2004/0131026 A1 | 7/2004 | Kim et al. | |
| 2004/0203336 A1 | 10/2004 | Sinnarajah et al. | |
| 2005/0107106 A1 | 5/2005 | Valkealahti et al. | |
| 2006/0111137 A1 | 5/2006 | Mori et al. | |
| 2006/0116152 A1 * | 6/2006 | Yahagi | 455/522 |

FOREIGN PATENT DOCUMENTS

| | | |
|---|---|---|
| JP | 09-107581 A | 4/1997 |
| JP | 11-266262 A | 9/1999 |
| JP | 2000-115071 A | 4/2000 |
| JP | 2000-278327 A | 10/2000 |
| JP | 2002-051006 A | 2/2002 |
| JP | 2002-095065 A | 3/2002 |
| JP | 2002-165262 A | 6/2002 |
| JP | 2002-261687 A | 9/2002 |
| JP | 2002-271400 A | 9/2002 |
| WO | 00/35235 A1 | 6/2000 |

* cited by examiner

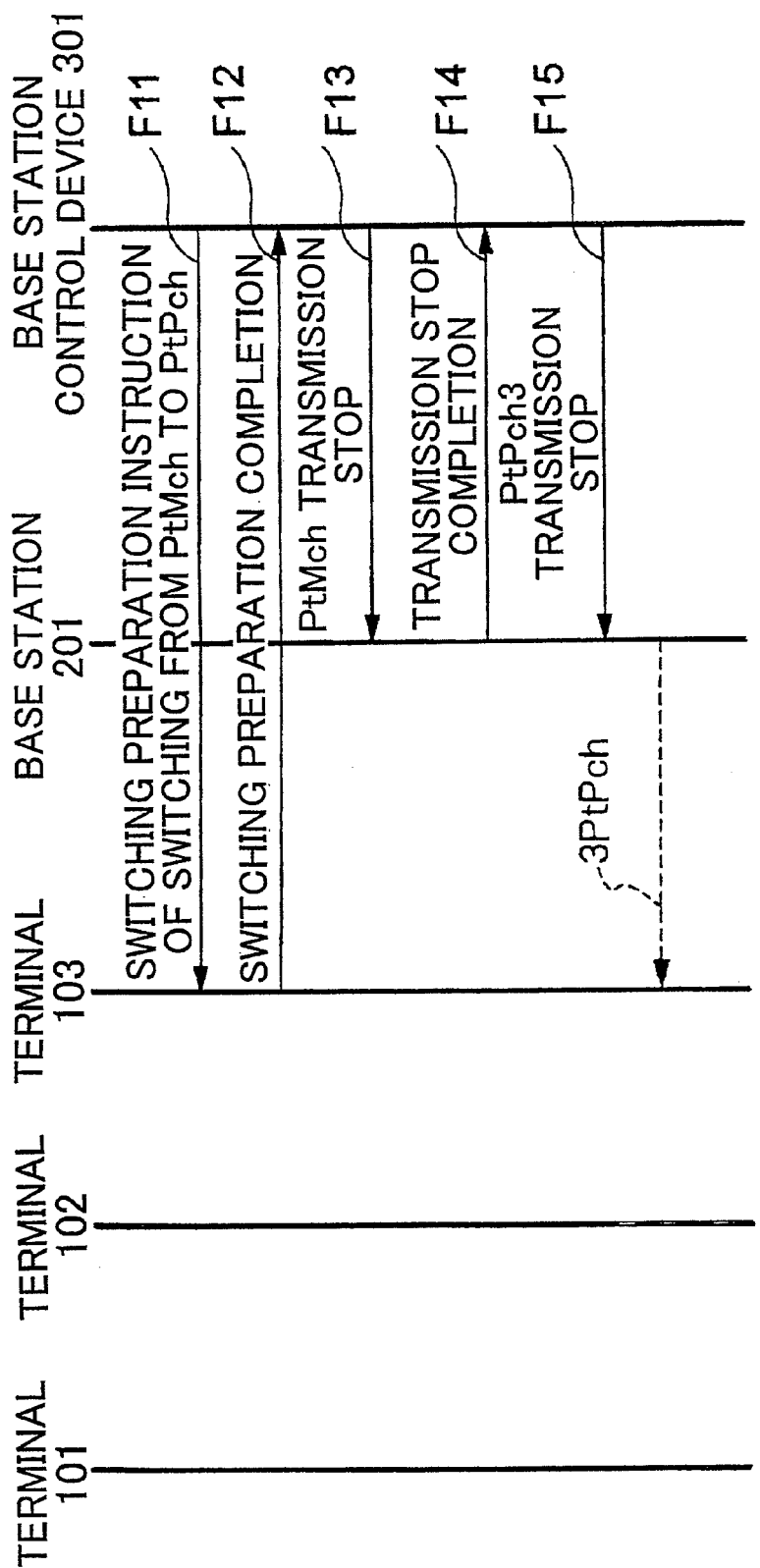

CONTENT DISTRIBUTION SYSTEM, NETWORK, AND CHANNEL SWITCHING CONTROL METHOD

CROSS-REFERENCE TO RELATED APPLICATIONS

This application is a Continuation of application Ser. No. 10/541,797 filed Jul. 8, 2005 which is a 371 National Stage Entry of PCT/JP2003/016980, filed Dec. 26, 2003 which claims priority under 35 U.S.C. § 119 from Japanese Patent Application No. 2003-3810 filed on Jan. 10, 2003. The entire disclosures of the prior applications, application Ser. Nos. 10/541,797, PCT/JP2003/016980 and JP 2003-3810 are considered part of the disclosure of the accompanying divisional application and are hereby incorporated by reference.

TECHNICAL FIELD

The present invention relates to a content distribution system, a network, and a channel switching control method, and more particularly, to a content distribution system that switches the type of radio channels used for a content distribution.

BACKGROUND ART

A broadcast-type service includes both a broadcast and multicast services, and provides the same content for a plurality of user terminals existing within the cell of each base station at the same time. The user terminal receiving the broadcast-type service within the cell should be able to receive content with a certain quality of service (QoS) as far as it is located within the area. To that end, a sufficient receiving power needs to be provided for the respective user terminals.

The broadcast-type service is realized by a point to multi-point (PtM) system or a point to point (PtP) system.

In the PtM system, a base station uses a single point to multi-point channel (common channel) reaching the cell boundary to distribute content to all user terminals within the cell. The PtM system is also referred to as "common channel system".

In the PtM system, a single downlink radio channel is used to distribute content to the user terminals, so that even in the case where a large number of the user terminals in the broadcast-type service area receive the content at the same time, the base station need not increase a transmission power of the radio channel irrespective of the number of the user terminals.

Therefore, with the PtM system, it is possible to increase the use effect of the radio resources in the case where a large number of the user terminals receive the broadcast-type service within the cell. When there is a sufficient downlink power capacity available in the operation of the broadcast-type service, it is possible for the base station to distribute content to all the user terminals within the cell by performing control such that the downlink transmission power of the PtM channel can reach the cell boundary. On the other hand, when there is not a sufficient downlink power capacity available, the base station performs control to set the downlink transmission power of the PtM channel to a value less than the downlink transmission power with which the PtM channel can reach the cell boundary. In this case, therefore, the base station can distribute content only to a part of the user terminals in the cell. That is, the user terminals near the cell boundary cannot receive the PtM channel and thereby cannot receive content.

In the PtP system, a base station uses point to point channels (individual channels) for respective user terminals to distribute the same content to the user terminals subscribing to the broadcast-type service within the cell. The PtP system is also referred to as "individual channel system".

The PtP system is used when there are a comparatively small number of user terminals subscribing to the broadcast-type service within the cell. The PtP system uses the individual channel, so that the base station can set the downlink transmission power of the individual channel to an adequate value by performing transmission power control. Therefore, when the number of the user terminals is comparatively small, it is possible to reduce the downlink transmission power for distributing content to the user terminals.

As described above, the PtP and PtM systems are available for realizing the broadcast-type service. Here, in order to determine to use which of the PtP and PtM systems, it is necessary to make a determination based on the radio environmental capacity of the radio communication resources estimating the respective downlink transmission power.

Disclosed in a non-patent document (3GPP TR 23.846 1.2.0, September, 2002, P.17) is that the radio channel type (point to multi-point or point to point) is determined based on the number of the user terminals subscribing to the broadcast-type service within the cell.

In the case where the radio channel type is determined based on the number of the user terminals subscribing to the broadcast-type service within the cell as described above, it is considered that the PtP channel is used when the number of the user terminals is not more than a certain threshold value and the PtM channel is used when the number thereof exceeds the threshold value.

However, the above method of determining the radio channel type used for the content distribution based on the number of the user terminals subscribing to the broadcast-type service within the cell has the following problem.

For example, in the case where the single PtM channel is used to distribute content to the user terminals subscribing to the broadcast-type service within the cell, when the number of the user terminals changes to become not more than a certain threshold value, the radio channel used for the content distribution is switched from the PtM channel to PtP channel, and the PtP channel is used to distribute the content to the respective user terminals. However, if all the user terminals are located near the cell boundary, the total of the transmission power of the PtP channel for the user terminals becomes greater than the transmission power of the PtM channel.

That is, in some cases, the switching function of the radio channel used for the content distribution based on the number of the user terminals lowers, rather than increases, the use effect of the radio resources. Therefore, it is necessary to perform the switching based on the abovementioned radio environmental capacity of the radio communication resources.

DISCLOSURE OF THE INVENTION

An object of the present invention is to provide a content distribution system, a network, and a channel switching control method capable of switching the type of radio channels used for a broadcast-type service by a determination based on the radio environmental capacity of the radio communication resources without lowering the use effect of the radio resources.

A content distribution system according to the present invention is characterized by comprising a channel switching determination means for determining whether the type of the communication channel sent from a base station to mobile station is switched based on the power for content distribution from the base station to the mobile station.

A channel switching control method according to the present invention is a channel switching control method of a content distribution system that distributes the content to a mobile station and is characterized by comprising a channel switching determination step of determining whether the type of the communication channel sent from a base station to the mobile station is switched based on the power for content distribution from the base station to the mobile station.

A network according to the present invention is characterized by comprising a channel switching determination means for determining whether the type of the communication channel sent from the base station to the mobile station is switched based on the power for content distribution from the base station to mobile station.

A channel switching control method according to the present invention is a channel switching control method of a network that distributes the content to a mobile station and is characterized by comprising determining whether the type of the communication channel sent from the base station to the mobile station is switched based on the power for content distribution from the base station to mobile station.

According to the present invention, it is determined whether the type of a communication channel sent from the base station to mobile station is switched based on the power for content distribution from the base station to mobile station. This switching of the communication channel type used for the content distribution prevents the use effect of the radio resources from lowering.

The effect of the present invention is to switch the radio channel type used for the broadcast-type service without lowering the use effect of the radio resources. This is because it is determined whether the radio channel type sent from the base station to mobile station is switched based on the power for content distribution from the base station to mobile station. The present invention allows a selection of a radio channel type appropriate for the situation of the radio resources.

BRIEF DESCRIPTION OF THE DRAWINGS

FIG. 30 is a sequence chart showing an operation of the mobile communication system according to the embodiment of the present invention in the case where the channel switching process (step T10) shown in FIG. 5 is performed under the condition shown in FIG. 8.

BEST MODE FOR CARRYING OUT THE INVENTION

Figure 1:
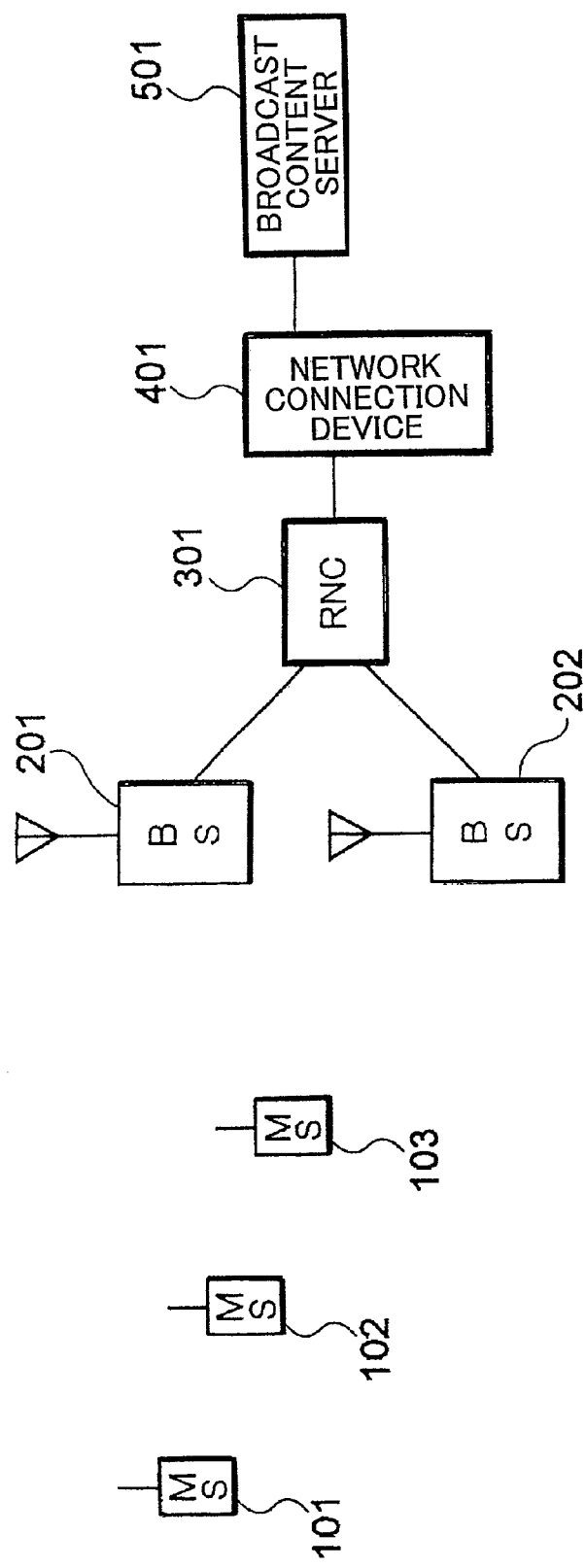
FIG. 1 is a view showing a configuration of a mobile communication system according to an embodiment of the present invention.

An embodiment of the present invention will be described below with reference to the accompanying drawings. In the following description, the same reference numerals denote the same parts through the drawings.

FIG. 1 is a view showing a configuration of a mobile communication system (content distribution system) according to the embodiment of the present invention. The mobile communication system according to the embodiment is applied to a mobile phone, a PHS (Personal Handyphone System) and the like.

As shown in FIG. 1, the mobile communication system according to the present embodiment includes user terminals 101 to 103 corresponding to mobile stations (MS), base station devices (BS) 201 and 202, a base station control device (RNC: Radio Network Controller) 301, a network connection device 401, and a broadcast content server 501.

The user terminals 101 to 103 are terminals that the users enjoying a mobile communication service provided by the mobile communication system according to the present embodiment have and carry. The user terminals 101 to 103 can receive the mobile communication service within the area that the mobile communication system covers.

A mobile phone or PHS (Personal Handyphone System) terminal can be taken as an example of the user terminals 101 to 103. In the present embodiment, any access method including a CDMA (Code Division Multiple Access), TDMA (Time Division Multiple Access), and the like can be used and any digital modulation method including a PSK (Phase Shift Keying), QPSK (Quadrature PSK), p/4 shift QPSK, OQPSK (Offset QPSK), HPSK (Hybrid PSK) can be used.

Although the internal configuration of each of the user terminals 101 to 103 differs depending on the employed access method and digital modulation method, it is possible to employ a configuration well known to those skilled in the art in any case. Therefore, although not shown in the drawing, each of the user terminals 101 to 103 functionally includes a radio section (a transmission circuit having an antenna, duplexer, modulator, and power amplifier and a reception circuit having a demodulator), a control section (a system controller and the like) which controls the entire operation, and a signal processing section (voice codec for voice coding/decoding, channel codec for coding/decoding control information (message) required for communication between the base station and mobile station) and executes a processing operation along respective process flows shown in sequence charts (to be described later) of the accompanying drawings under the control of the control section. The processing operation is realized when, for example, a CPU in the control section executes a control program stored in a readable manner on a memory.

When being located within the cell of the base station device 201, the user terminals 101 to 103 can communicate with the base station device 201 through a radio medium; similarly, when being located within the cell of the base station device 202, the user terminals 101 to 103 can communicate with the base station device 202 through a radio medium.

The base station devices 201 and 202 are provided within the area that the mobile communication system covers. The base station devices 201 and 202 are connected to the network connection device 401 through the base station control device 301.

The base station device 201 and 202 may be mounted on, for example, a mobile phone base station or PHS base station. In the present embodiment, any access method including a CDMA, TDMA, and the like can be used and any digital modulation method including a PSK, QPSK, p/4 shift QPSK, OQPSK, HPSK and the like can be used.

Although the internal configuration of each of the base station devices 201 and 202 differs depending on the employed access method and digital modulation method, it is possible to employ a configuration well known to those skilled in the art in any case. Therefore, although not shown in the drawing, each of the base station devices 201 and 202 functionally includes a radio section (a transmission circuit having an antenna, duplexer, modulator, and power amplifier and a reception circuit having a demodulator), a control section (a system controller and the like) which controls the entire operation, and a signal processing section (voice codec for voice coding/decoding, channel codec for coding/decoding control information (message) required for communication between the base station device and user terminal (mobile station)) and executes a processing operation along respective process flows shown in sequence charts (to be described later) of the accompanying drawings under the control of the control section. The processing operation is realized when, for example, a CPU in the control section executes a control program stored in a readable manner on a memory.

The base station control device 301 has functions of relaying a reception signal and assigning a radio channel (communication channel) for transmitting a radio signal between respective user terminals and base station devices. The respective functions are realized when, for example, a CPU in an incorporated controller executes a control program stored on a memory and thereby executes a processing operation along respective process flows shown in sequence charts (to be described later) of the accompanying drawings.

The base station devices 201, 202 and base station control device 301 constitute a RAN (Radio Access Network). The content distribution system, network channel switching control means, and channel switching control method according to the present invention function in the processing operations realized by the program control of the base station devices 201, 202, and/or base station control device 301 in this embodiment.

The network connection device 401 is connected to, for example, a public telephone network, public data network, private network, facility of the various service providers (not shown) and is also connected to the broadcast content server 501.

The broadcast content server 501 is, for example, constituted by one or more computer machines such as a PC (Personal Computer) or a dedicated server connected to a network in a communicable manner and operates under the program control of a CPU in the machine. The broadcast content server 501 stores various contents for the broadcast-type service, which is one of mobile communication services, in the data storage area assigned on a storage medium such as a memory or hard disk as data to be processed (table or database) by the CPU. The content of the broadcast content server 501 is distributed to users subscribing to various service providers. The content is distributed to the user terminals 101 to 103 through the network connection device 401, base station control device 301, and base station device 201 or 202.

As a radio channel type for distributing the same content to the user terminals 101 to 103 to be provided with the broadcast-type service at the same time, a point to multi-point (PtM) and point to point (PtP) are available.

According to the embodiment of the present invention, when the user terminals 101 to 103 receive the content on the PtP channel (individual channel), it is determined whether the radio channel for the content distribution is switched from the PtP channel to the single PtM channel based on the total of the downlink transmission power of the PtP channel and the downlink transmission power of the single PtM channel (common channel) used for distributing the content to the user terminals 101 to 103.

When the user terminals 101 to 103 receive the content on the single PtM channel, it is determined whether the radio channel for the content distribution is switched from the PtM channel to the PtP channel based on the downlink transmission power of the PtM channel and the total of the downlink transmission power of the PtP channel used for distributing the content to the user terminals 101 to 103.

When the radio channel type is switched, a switching process is performed in such a manner not to interrupt the content reception operation of the user terminals 101 to 103, or with an interruption.

In the case where the switching process is performed without the interruption of content reception, while one radio channel currently used for the content distribution to the user terminals 101 to 103 is maintained, the other radio channel is set. Further, the switching process is performed such that the total of the power of the transmission from the base station that transmits the content to the user terminals 101 to 103 to all the user terminals (user terminals 101 to 103 and not-shown user terminals that do not subscribe to the broadcast-type service) within the cell of the base station does not exceed the upper limit of the transmission power that the base station can output to the cell during the time period when these radio channels different from each other are concurrently set.

In the case where the switching process is performed with the interruption of content reception, one radio channel currently used for the content distribution to the user terminals 101 to 103 is canceled, and the other radio channel is then set. Also in this case, the switching process is performed such that the total of the downlink transmission power of the base station does not exceed the upper limit during the switching process time.

Hereinafter, an operation of the mobile communication system according to the embodiment of the present invention in the case where the plurality of user terminals subscribing to the broadcast-type service within the cell of the base station 201 receive the content on the PtP channel will be described with reference to the drawings.

Figure 2:
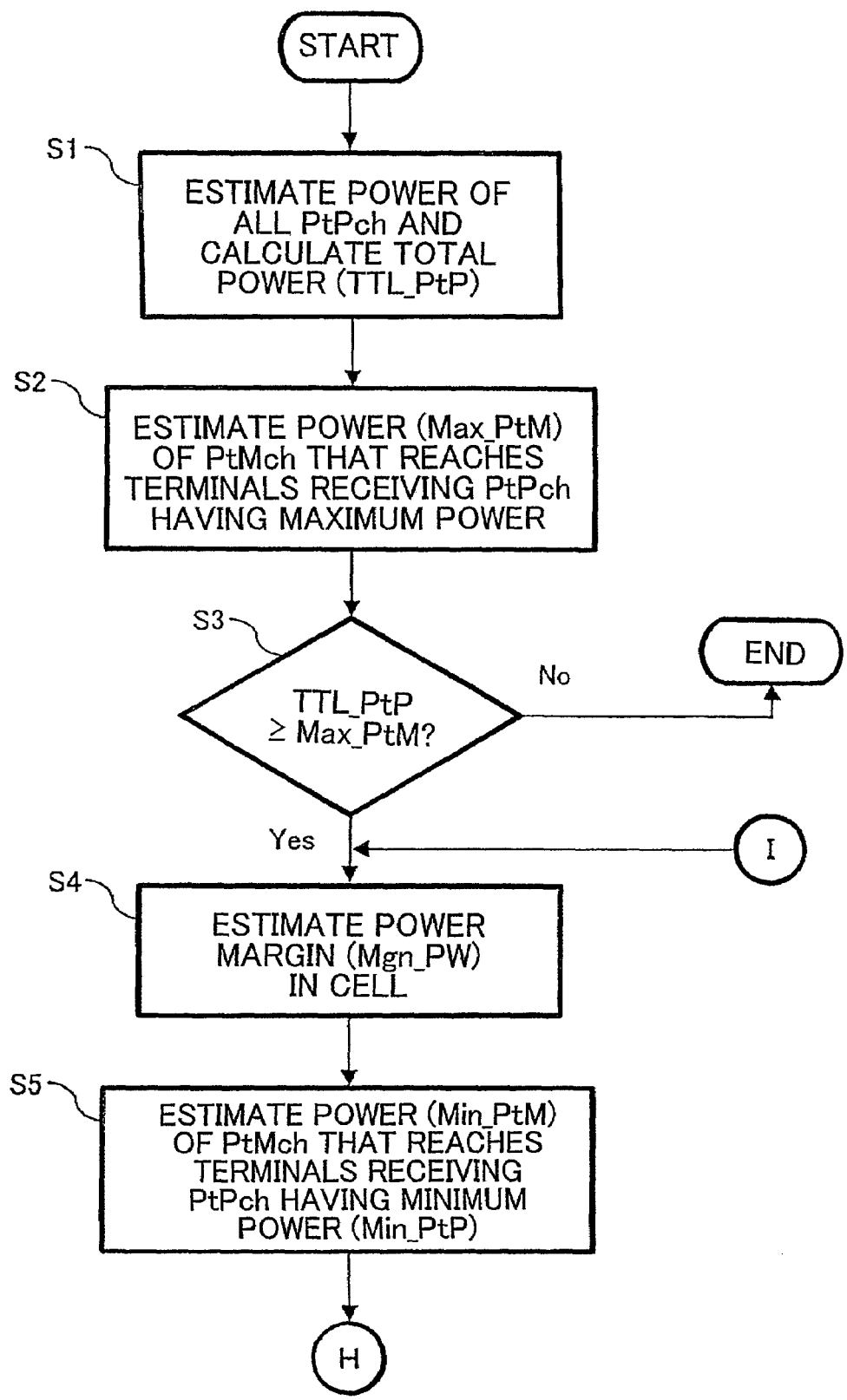
FIG. 2 is a flowchart showing an operation of the mobile communication system according to the embodiment of the present invention in the case where a PtP channel is used to provide a broadcast-type service.
Figure 3:
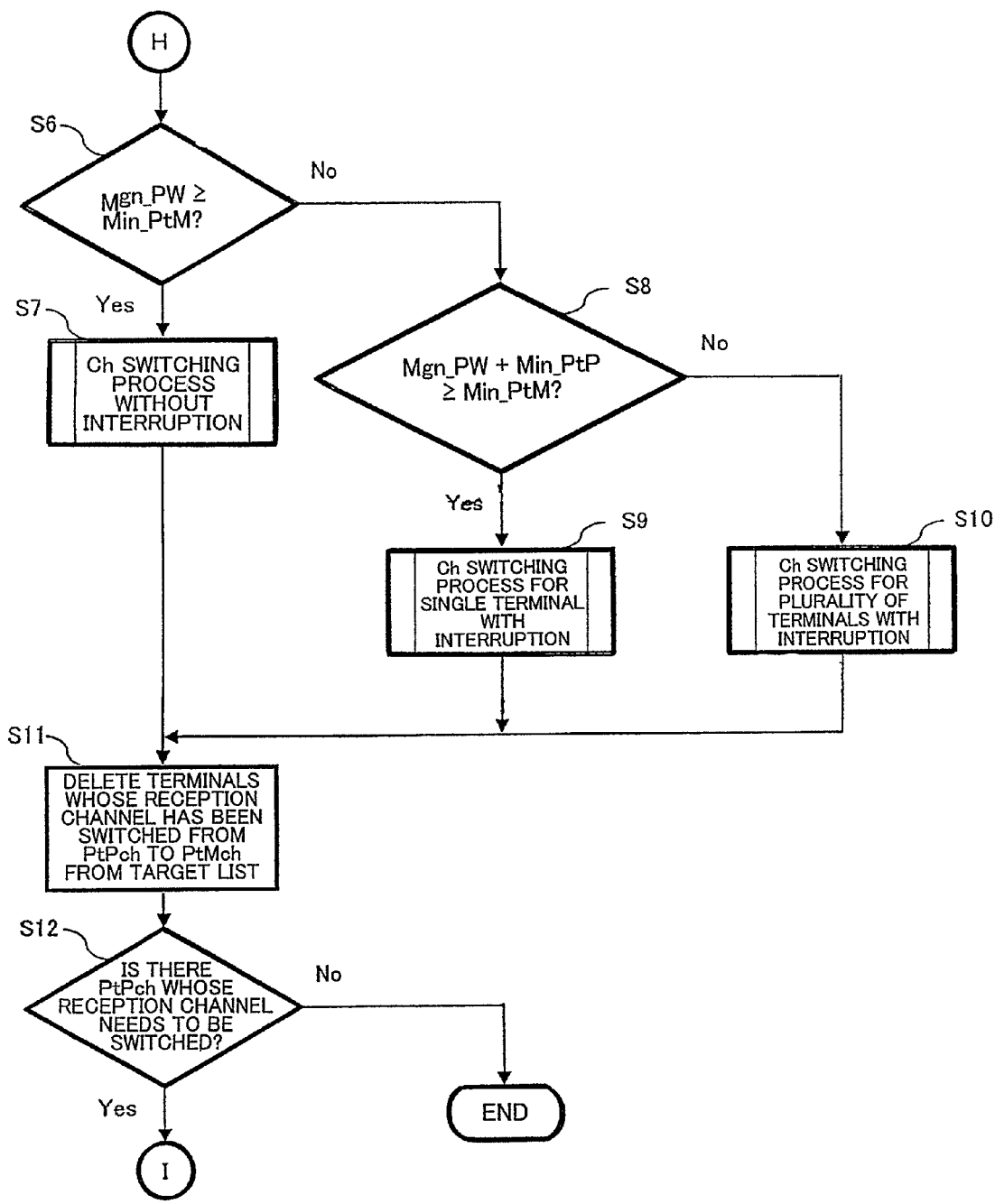
FIG. 3 is a flowchart showing an operation subsequent to the operation shown in FIG. 2.

FIGS. 2 and 3 are flowcharts each showing an operation of the mobile communication system according to the embodiment of the present invention in the case where the PtP channel is used to provide the broadcast-type service.

The processing procedure shown in FIGS. 2 and 3 is activated when any user terminal within the cell of the base station 201 requests the broadcast-type service or when the user terminal that has already requested the broadcast-type service enters the cell. That is, the processing procedure is activated every time the number of the user terminals within the cell that receives the broadcast-type service on the PtP channel increases.

Alternatively, the processing procedure shown in FIGS. 2 and 3 may be periodically activated with a predetermined interval. The reason for the above is that even when the number of the user terminals that receive the broadcast-type service on the PtP channel is not changed, the situation in which the PtP channel needs to be switched to the PtM channel depending on the location of the user terminal can occur. For example, in the case where the user terminal to receive the broadcast-type service on the PtP channel moves to increase the downlink transmission power of the PtP channel (in general, in the case where the user terminal moves away from the base station antenna), the above situation can occur.

Alternatively, the processing procedure shown in FIGS. 2 and 3 may be activated when the allowable number of users that receive the broadcast-type service is reduced. A mobile communication service of the mobile communication system is classified into the broadcast-type service that provides the same content to a plurality of users and a non-broadcast-type service that individually provides a telephone service, E-mail service, or the like to the respective users. The timing that causes the allowable number of users that receive the broadcast-type service or non-broadcast-type service to be increased or reduced is determined depending on the allocation of the service to be provided to the users located in respective radio areas. When the allowable number of users that receive the broadcast-type service is reduced, the transmission power that can be used for distribution of the broadcast-type service is restricted to a lower value, with the result that the number of the user terminals that can receive the broadcast-type service on the PtP channel is reduced. Accordingly, the processing procedure shown in FIGS. 2 and 3 is activated to determine whether a switching process from the PtP channel to the PtM channel is performed. In this case, there is a possibility that a part of the user terminals, which require more power, cannot receive the content.

Alternatively, the processing procedure shown in FIGS. 2 and 3 may be activated when the allowable number of users that receive the non-broadcast-type service is increased. When the allowable number of users that receive the non-broadcast-type service is increased, the transmission power that can be used for distribution of the broadcast-type service is restricted to a lower value, with the result that the number of the user terminals that can receive the broadcast-type service on the PtP channel is reduced. Accordingly, the processing procedure shown in FIGS. 2 and 3 is activated to determine whether a switching process from the PtP channel to the PtM channel is performed. Also in this case, there is a possibility that a part of the user terminals, which require more power, cannot receive the content. Alternatively, the processing procedure shown in FIGS. 2 and 3 may be activated when the total of the transmission power of the PtP channel used for the content distribution exceeds a predetermined value.

When one of the abovementioned conditions is satisfied to activate the processing procedure shown in FIGS. 2 and 3, the base station control device 301 orders the base station 201 to recognize the transmission power of all the PtP channels that the user terminals to receive the broadcast-type service in the cell of the base station 201 are using. The base station 201 then recognizes the transmission power of all the PtP channels, and the base station 201 or base station control device 301 calculates the total (TTL_PtP) of the transmission power of all the PtP channels (step S1). The report of the transmission power recognized by the base station 201 to the base station control device 301 allows the base station control device 301 to calculate the total (TTL_PtP).

The base station 201 or base station control device 301 estimates the transmission power of the PtM channel required to distribute the content to the user terminal (hereinafter, referred to as "first user terminal") that is to receive the content on the PtP channel (hereinafter, referred to as "first PtP channel") having the maximum power of the transmission powers of all the PtP channels. That is, the base station 201 or base station control device 301 estimates the transmission power (Max_PtM) of the PtM channel that reaches the first user terminal (step S2). The transmission power (Max_PtM) of the PtM channel can be estimated based on the transmission power of the first PtP channel and measurement information from the first user terminal. The measurement information from the first user terminal is information related to reception power of the first PtP channel. In the estimation process in step S2, the first user terminal measures the reception power of the first PtP channel and reports the measurement result to the base station 201 or base station control device 301.

The base station 201 or base station control device 301 compares the total (TTL_PtP) of the transmission power of the PtP channel and transmission power (Max_PtM) of the PtM channel that reaches the first user terminal (step S3). When the total (TTL_PtP) is less than the transmission power (Max_PtM) (No in step S3), the base station 201 or base station control device 301 determines that a switching process from the PtP channel to PtM channel need not be performed to end this flow and waits for a new start condition.

On the other hand, when the total (TTL_PtP) is not less than the transmission power (Max_PtM) (Yes in step S3), the base station 201 or base station control device 301 determines to perform the switching process from PtP channel to PtM channel and estimates the power margin (Mgn_PW) in the cell of the base station 201 (step S4). The power margin (Mgn_PW) is a difference between the upper limit of the transmission power that the base station 201 can output to the cell and the total of the transmission power that the base station 201 outputs to all the user terminals (user terminals that receive the broadcast-type service in the cell and user terminals that receive the non-broadcast-type service in the cell) in the cell.

The base station 201 or base station control device 301 estimates the transmission power of the PtM channel required to distribute the content to the user terminal (hereinafter, referred to as "second user terminal") that is to receive the content on the PtP channel (hereinafter, referred to as "second PtP channel") having the minimum power (Min_PtP) of the transmission powers of all the PtP channels. That is, the base station 201 or base station control device 301 estimates the transmission power (Min_PtM) of the PtM channel that reaches the second user terminal (step S5). The transmission power (Min_PtM) can be estimated based on the transmission power of the second PtP channel and measurement information from the second user terminal. The measurement information from the second user terminal is information related to reception power of the second PtP channel. In the estimation process in step S5, the second user terminal measures the reception power of the second PtP channel and reports the measurement result to the base station 201 or base station control device 301.

In some cases, the transmission power of the PtP channel calculated in step S1 may differ from the initial value at this stage due to movement of the user terminals or the like, the transmission power of all the PtP channels may be recalculated in step S5.

The base station 201 or base station control device 301 compares the power margin (Mgn_PW) and the transmission power (Min_PtM) of the PtM channel that reaches the second user terminal (step S6). When the power margin (Mgn_PW) is not less than the transmission power (Min_PtM) of the PtM channel that reaches the second user terminal (Yes in step S6), a switching process from the second PtP channel to PtM channel is performed (step S7) in such a manner not to interrupt the content reception operation in the second user terminal. In the channel switching process, after the PtM channel that reaches the second user terminal is established while the second PtP channel is maintained, the channel for distributing the content to the second user terminal is switched from the second PtP channel to the established PtM channel.

On the other hand, when the power margin (Mgn_PW) is less than the transmission power (Min_PtM) of the PtM channel that reaches the second user terminal (No in step S6), the base station 201 or base station control device 301 compares the value obtained by adding the transmission power (Min_PtP) of the second PtP channel to the power margin (Mgn_PW) and the transmission power (Min_PtM) of the PtM channel that reaches the second user terminal (step S8).

When "Mgn_PW+Min_PtP≧Min_PtM" is satisfied (Yes in step S8), a channel switching process for the second user terminal is performed with interruption of content reception operation (step S9). In this switching process, the PtM channel that reaches the second user terminal is established after the second PtP channel has been canceled, and the second user terminal receives the content on the established PtM channel. Therefore, the content reception operation is interrupted in the second user terminal during the time period between the cancel of the second PtP channel and establishment of the PtM channel that reaches the second user terminal.

When "Mgn_PW+Min_PtP<Min_PtM" is satisfied (No in step S8), a channel switching process for a plurality of user terminals that receive the broadcast-type service in the cell of the base station 201 is performed with interruption of content reception operation (step S10). In this channel switching process, the PtM channel that reaches all the plurality of user terminals is established after the PtP channel used for the content distribution to the plurality of user terminals has been canceled, and the plurality of user terminals receive the content on the established PtM channel. It goes without saying that this channel switching process is performed such that the total of the downlink transmission power of the base station 201 does not exceed the upper limit of the transmission power that the base station 201 can output to the cell 100.

When the channel switching process (step S10) is performed for all the user terminals that receive the broadcast-type service in the cell, the total of the downlink transmission power of the base station 201 does not exceed the upper limit during the channel switching process (step S10). The reason is that the transmission power (Max_PtM) of the PtM channel that reaches the first user terminal is not more than the total (TTL_PtP) of the transmission power of the PtP channel (see step S3).

After the process in steps S7, S9, or S10 has been completed, the flow advances to step S11. The base station 201 or base station control device 301, which previously holds a target list in which all the user terminals that receive the broadcast-type service in the cell of the base station 201 are registered, deletes the user terminals whose reception channel has been switched from the PtP channel to PtM channel in the any of the above steps from the target list (step S11). The base station 201 or base station control device 301 then determines whether the user terminal whose reception channel needs to be switched from PtP channel to PtM channel exists or not based on the target list (step S12).

If the user terminal that receives the broadcast-type service on the PtP channel still exists (Yes in step S12), the base station 201 or base station control device 301 shifts to step S4. On the other hand, all the user terminals that receive the broadcast-type service are receiving the content on the PtM channel (No in step S12), the base station 201 or base station control device 301 ends this flow and waits for a new start condition.

Only a part of the user terminals that receive the broadcast-type service in the cell may be registered in the above target list, not all the user terminals that receive the broadcast-type service in the cell. In this case, a mixed state of the PtP channel and PtM channel may arise temporary or constantly.

When the power margin (Mgn_PW) is less than the transmission power (Min_PtM) in step S6, it is determined, in step S8, which of the channel switching processes of steps S9 and step S10 is performed. However, the processes in step 8 and step 9 may be omitted. In this case, when the power margin (Mgn_PW) is less than the transmission power (Min_PtM) in step S6, the channel switching process (step S10) is performed.

When the total (TTL_PtP) is not less than the transmission power (Max_PtM) in step S3 (Yes in step S3), it is determined to perform the channel switching process from the PtP channel to PtM channel. However, even when the total (TTL_PtP) is not less than the transmission power (Max_PtM), it may be determined not to perform the channel switching process depending on the security attribute of the content. For example, in the case where the content is paid content, the channel switching process may not be performed.

Next, the details of the channel switching process of step S7 (FIG. 3) will be described with reference to the drawings.

Figure 6:
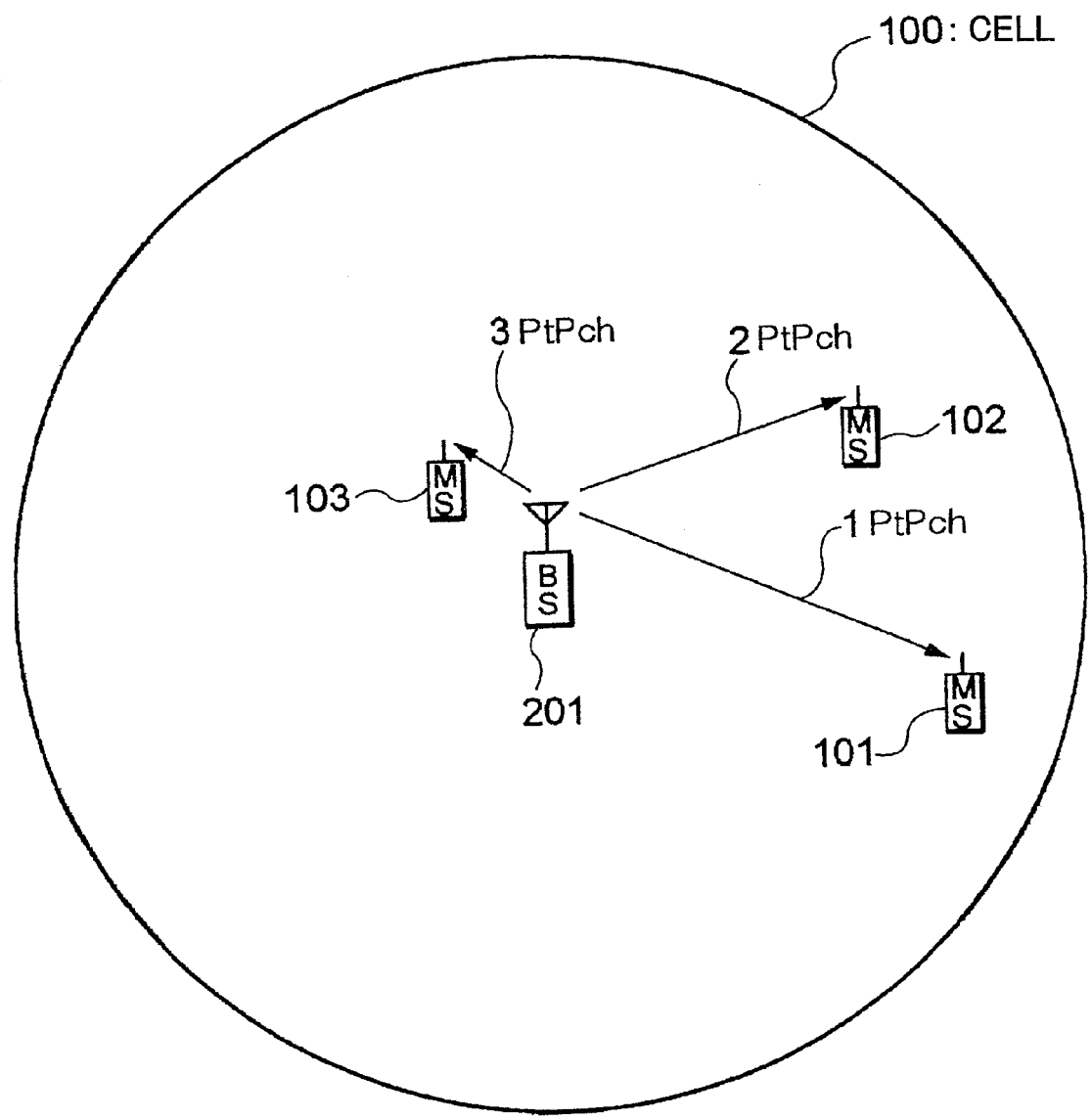
FIG. 6 is a view for explaining a state between a base station and user terminals located within the cell of the base station in the case where a channel switching process is performed in the operation of the mobile communication system according to the embodiment of the present invention.

FIG. 6 shows a state where the user terminals 101 to 103 located within the cell 100 of the base station 201 receive the content on the PtP channels 1 to 3, and the corresponding parts as those in FIG. 1 are indicated by the same reference numerals. In FIG. 6, the base station 201 uses the PtP channel 1 to transmit the content to the user terminal 101, uses the PtP channel 2 to transmit the content to the user terminal 102, and uses the PtP channel 3 to transmit the content to the user terminal 103. Among the transmission powers of the PtP channels 1 to 3 from the base station 201 to user terminals 101 to 103, the transmission power of the PtP channel 1 is highest, and that of the PtP channel 3 is lowest.

Figure 7:
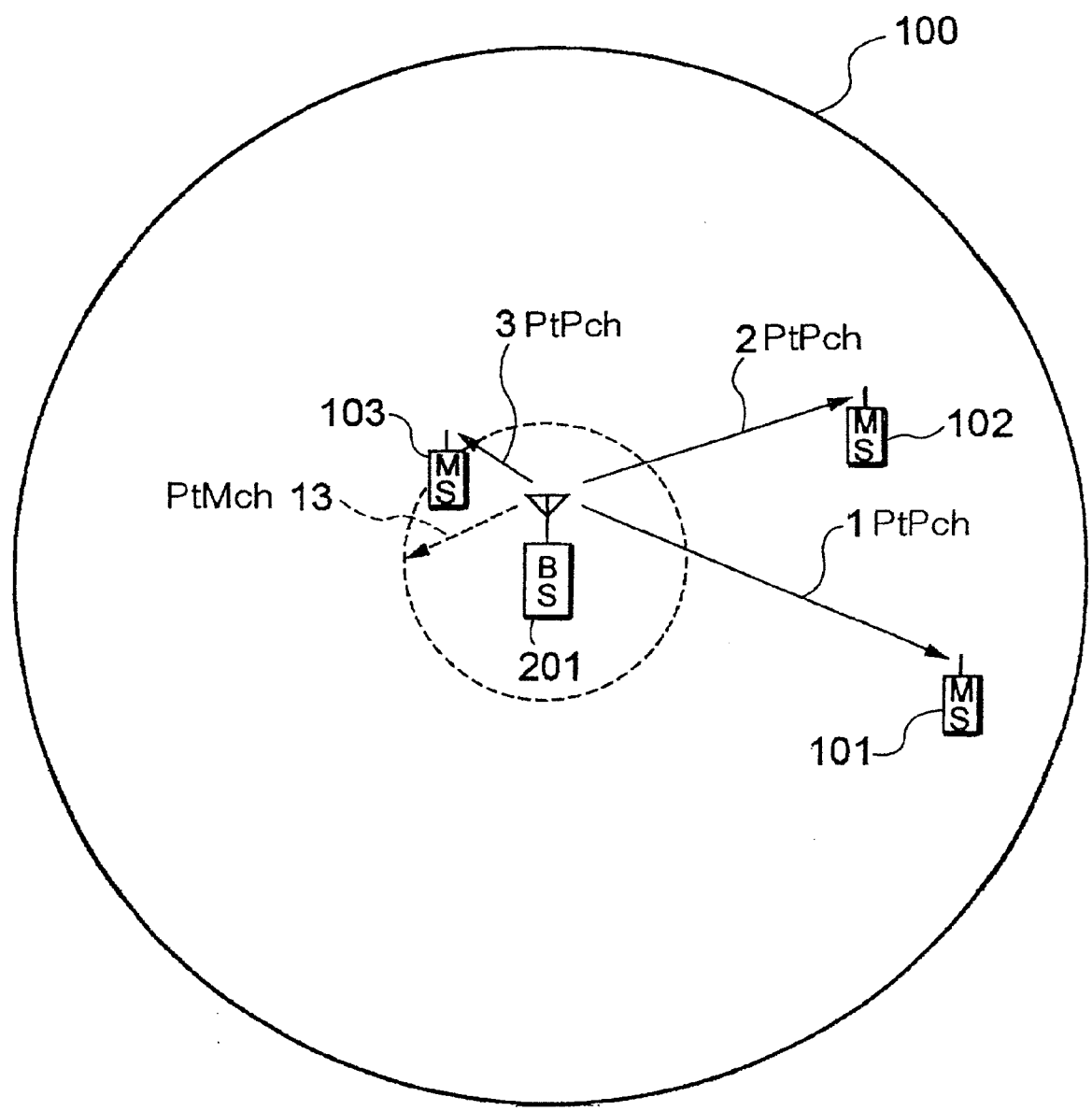
FIG. 7 is a view for explaining a state between a base station and user terminals located within the cell of the base station in the case where a channel switching process is performed in the operation of the mobile communication system according to the embodiment of the present invention.
Figure 17:
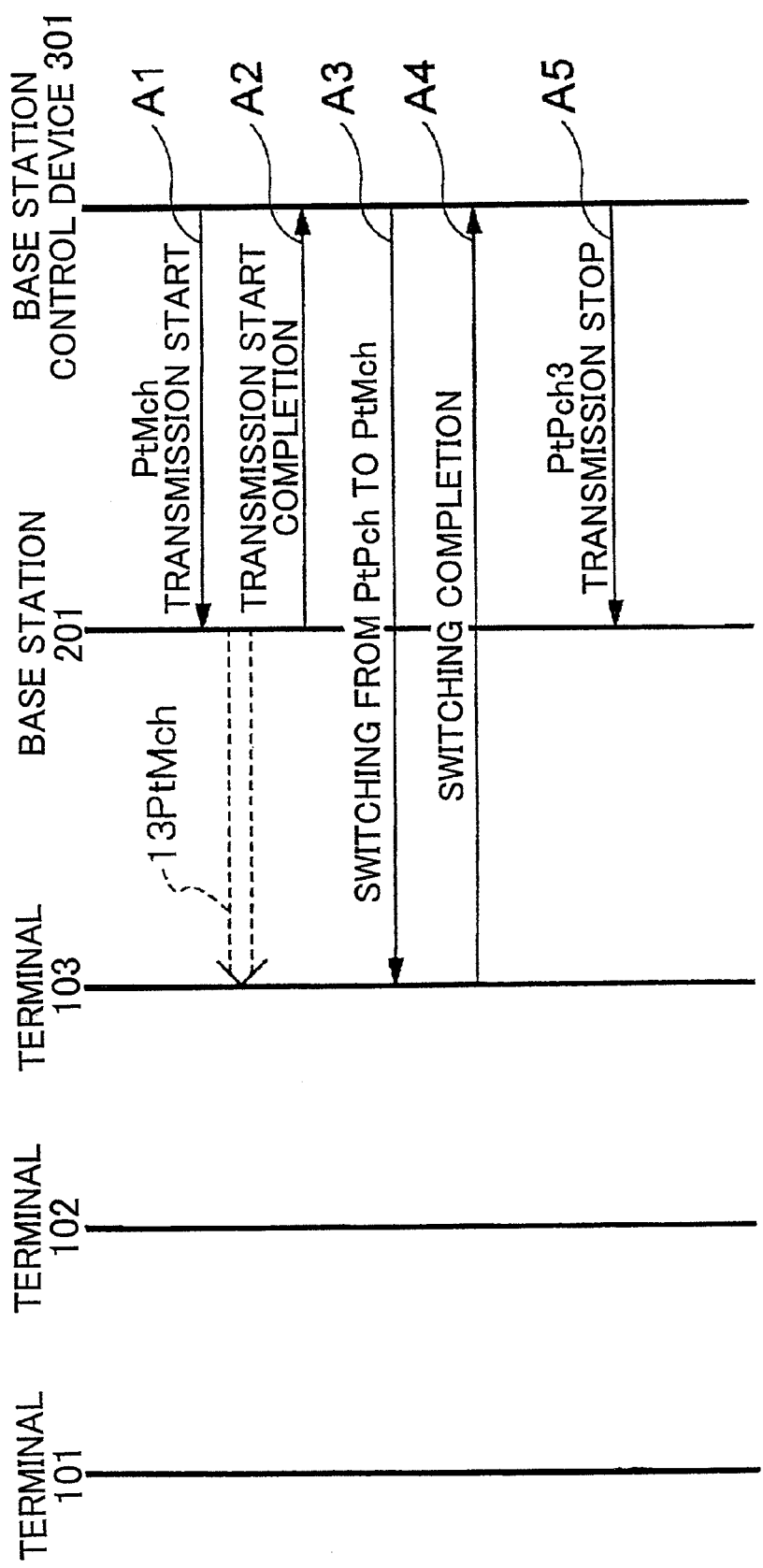
FIG. 17 is a sequence chart showing an operation of the mobile communication system according to the embodiment of the present invention in the case where the channel switching process (step S7) shown in FIG. 3 is performed under the condition shown in FIG. 6.

FIG. 17 is a sequence chart showing an operation in the case where the channel switching process of step S7 (FIG. 3) is performed under the condition shown in FIG. 6. When the channel switching process of step S7 (FIG. 3) is performed under the condition shown in FIG. 6, the base station control device 301 sends a PtM channel transmission start message to the base station 201 to allow the base station 201 to start the transmission of PtM channel 13 (see FIG. 7) that reaches the user terminal 103, as shown in FIG. 17 (step A1). Upon receiving the PtM channel transmission start message, the base station 201 starts the transmission of the PtM channel 13 while maintaining the PtP channel 3 as shown in FIG. 7 and returns a transmission start completion message to the base station control device 301 (step A2).

Upon receiving the transmission start completion message, the base station control device 301 sends, to the user terminal 103, a switching instruction message for instructing the user terminal 103 to receive the content not on the PtP channel 3 but on the PtM channel 13 (step A3). Upon receiving the switching instruction message, the user terminal 103 starts an operation of receiving the content on the PtM channel 13 and returns a switching completion message to the base station control device 301 after confirming that the content can be received on the PtM channel 13 in a good condition (step A4).

Figure 8:
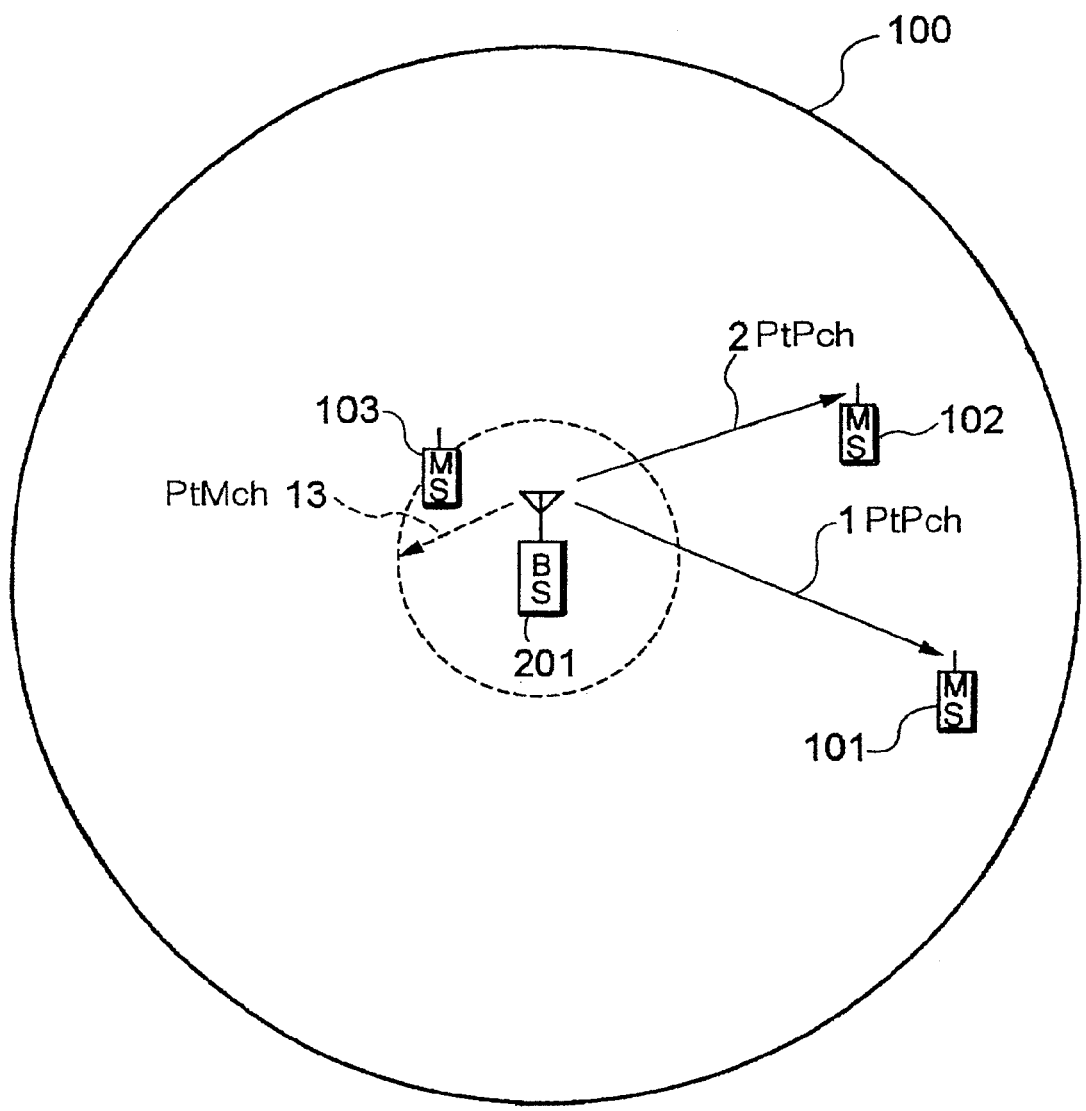
FIG. 8 is a view for explaining a state between a base station and user terminals located within the cell of the base station in the case where a channel switching process is performed in the operation of the mobile communication system according to the embodiment of the present invention.

Upon receiving the switching completion message, the base station control device 301 sends a PtP channel transmission stop message for canceling the PtP channel 3 to the base station 201 (step A5). Upon receiving the transmission stop message, the base station 201 stops the transmission of the PtP channel 3. As a result, the radio channel used for the content distribution to the user terminal 103 is switched from the PtP channel 3 to PtM channel 13, and the user terminal 103 receives the content on the PtM channel 13, as shown in FIG. 8.

The base station 201 or base station control device 301 may send an inquiry message for inquiring of the user terminal 103 whether or not the stop of the content reception on the PtP channel 3 and the start of the content reception on the PtM channel 13 are possible before the transmission of the switching instruction message in step A3. In this case, the base station 201 or base station control device 301 may send the switching instruction message at the time point when receiving an OK reply from the user terminal 103.

However, when receiving a reply indicating that it is impossible to perform a normal content reception from the user terminal 103 as a result of the inquiry message, the base station 201 or base station control device 301 rearranges the transmission power of the PtM channel 13 based on the current transmission power of the PtP channel 3, the current reception power of the PtP channel 3 measured by the user terminal 103, and the like. After the rearrangement of the transmission power of the PtM channel 3, the base station 201 or base station control device 301 sends an inquiry message to the user terminal 103 again.

As described above, in FIG. 8, the user terminal 101 receives the content on the PtP channel 1, the user terminal 102 receives the content on the PtP channel 2, and the user terminal 103 receives the content on the PtM channel 13.

Figure 9:
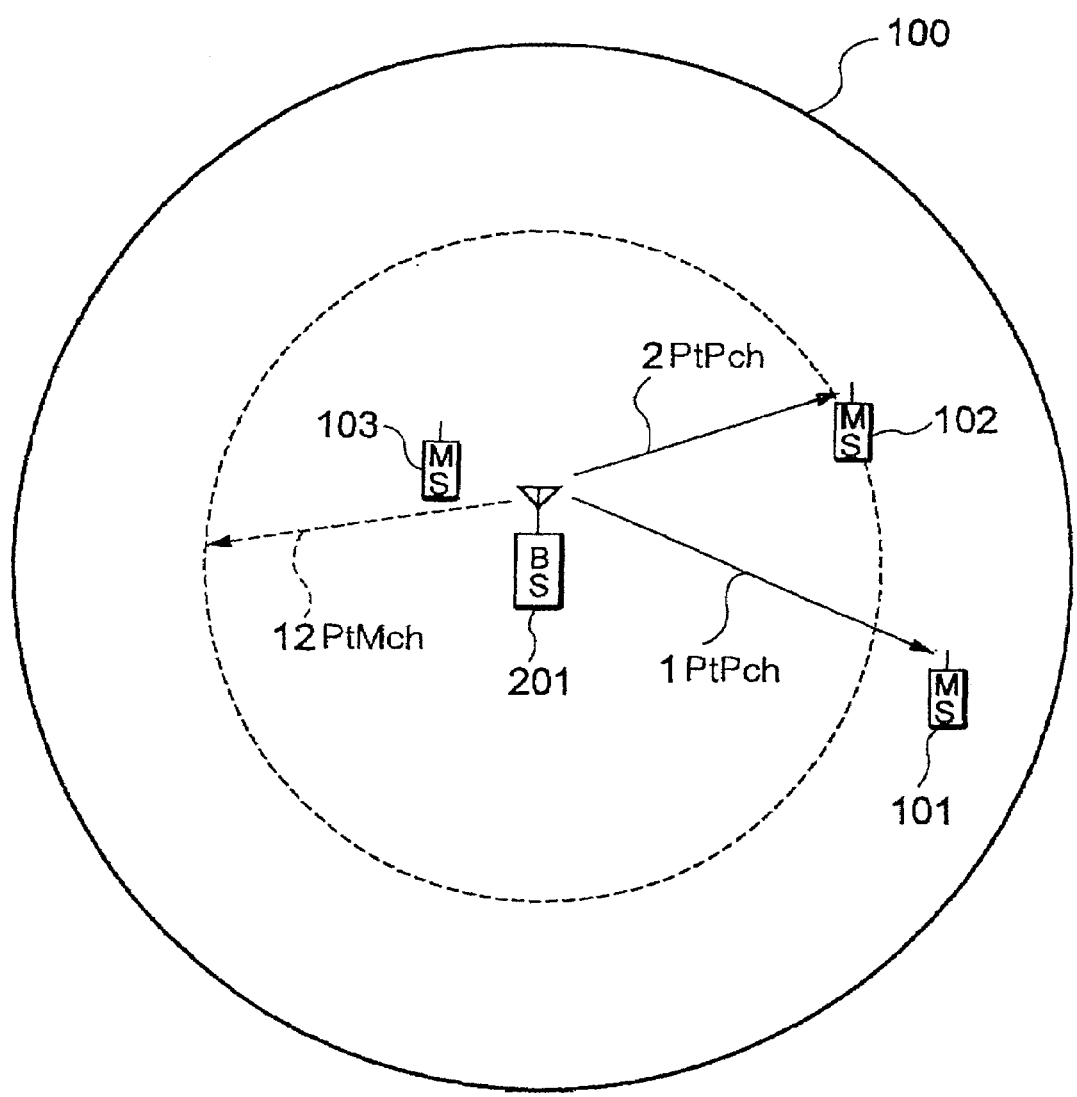
FIG. 9 is a view for explaining a state between a base station and user terminals located within the cell of the base station in the case where a channel switching process is performed in the operation of the mobile communication system according to the embodiment of the present invention.
Figure 18:
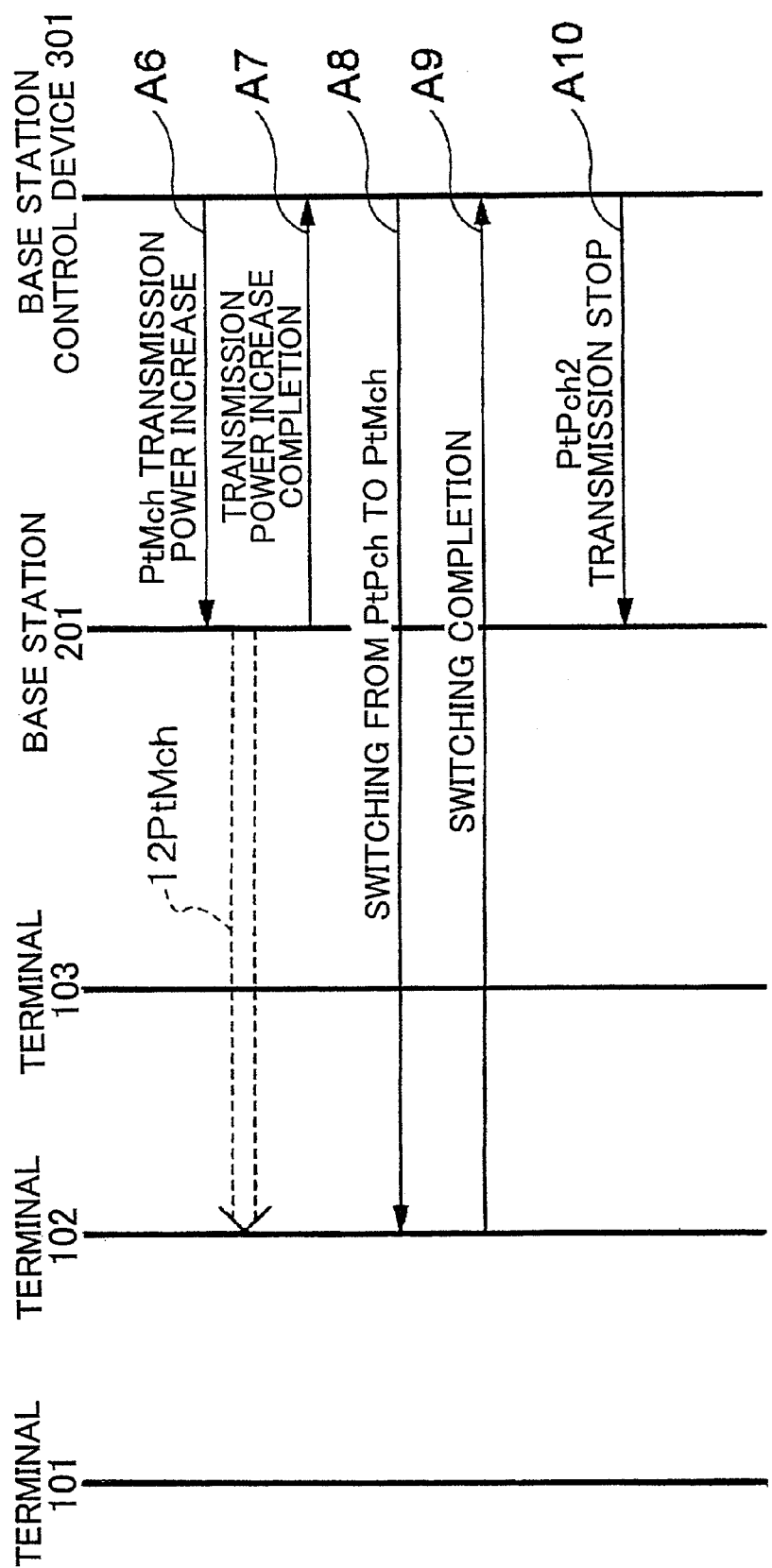
FIG. 18 is a sequence chart showing an operation of the mobile communication system according to the embodiment of the present invention in the case where the channel switching process (step S7) shown in FIG. 3 is performed under the condition shown in FIG. 8.

FIG. 18 is a sequence chart showing an operation in the case where the channel switching process of step S7 (FIG. 3) is performed under the condition shown in FIG. 8. When the channel switching process of step S7 (FIG. 3) is performed under the condition shown in FIG. 8, the base station control device 301 sends a PtM channel transmission power increase message to the base station 201, as shown in FIG. 18 (step A6). The PtM channel transmission power increase message is a message for increasing the transmission power of PtM channel 13 so as to allow the PtM channel 13 to reach the user terminal 102. Upon receiving the transmission power increase message, the base station 201 increases the transmission power of the PtM channel 13. As a result, the PtM channel 12 that reaches the user terminal 102 is generated as shown in FIG. 9. Since the transmission power of the PtM channel 12 that reaches the user terminal 102 has been already estimated in step S5 of FIG. 2, the base station 201 can generate the PtM channel 12 by increasing the transmission power of the PtM channel 13 based on the estimated transmission power of the PtM channel 12.

After generating the PtM channel 12, the base station 201 returns a transmission power increase completion message to the base station control device 301 (step A7). In response to the transmission power increase completion message, the base station control device 301 sends, to the user terminal 102, a switching instruction massage for instructing the user terminal 102 to receive the content not on the PtP channel 2, but on the PtM channel 12 (step A8). Upon receiving the switching instruction message, the user terminal 102 starts an operation of receiving the content on the PtM channel 12 and returns a switching completion message to the base station control device 301 after confirming that the content can normally be received on the PtM channel 12 (step A9).

Figure 10:
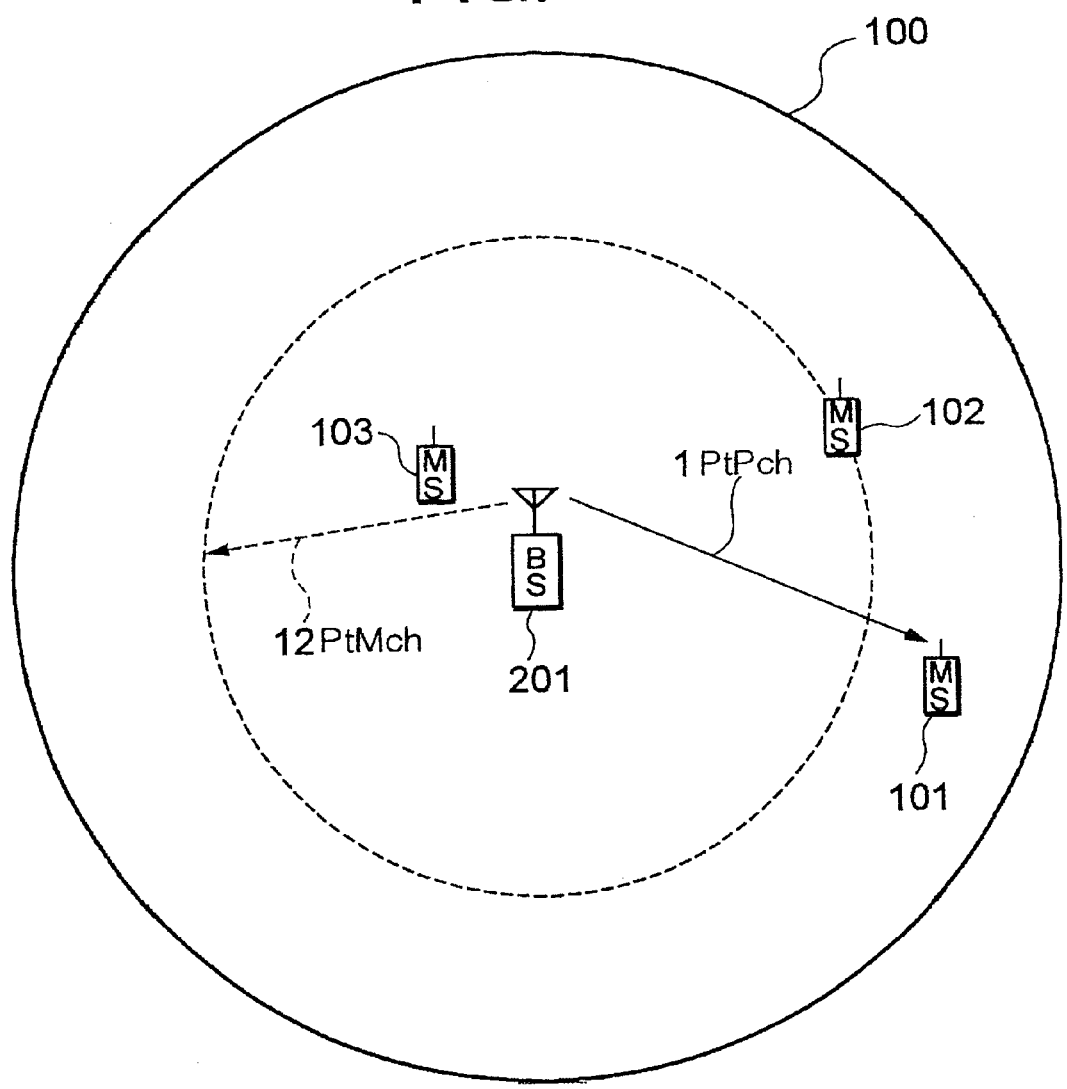
FIG. 10 is a view for explaining a state between a base station and user terminals located within the cell of the base station in the case where a channel switching process is performed in the operation of the mobile communication system according to the embodiment of the present invention.

Upon receiving the switching completion message, the base station control device 301 sends a PtP channel transmission stop message for canceling the PtP channel 2 to the base station 201 (step A10). Upon receiving the transmission stop message, the base station 201 stops the transmission of the PtP channel 2. As a result, the radio channel used for the content distribution to the user terminal 102 is switched from the PtP channel 2 to PtM channel 12, and the user terminals 102 and 103 receive the content on the PtM channel 12, as shown in FIG. 10.

The base station 201 or base station control device 301 may send an inquiry message for inquiring of the user terminal 102 whether or not the stop of the content reception on the PtP channel 2 and the start of the content reception on the PtM channel 12 are possible before the transmission of the switching instruction message in step A8. In this case, the base station 201 or base station control device 301 sends the switching instruction message at the time point when receiving an OK reply from the user terminal 102.

However, when receiving a reply indicating that it is impossible to perform a normal content reception from the user terminal 102 as a result of the inquiry message, the base station 201 or base station control device 301 rearranges the transmission power of the PtM channel 12 based on the current transmission power of the PtP channel 2, the current reception power of the PtP channel 2 measured by the user terminal 102, and the like. After the rearrangement of the PtM channel 12, the base station 201 or base station control device 301 sends an inquiry message to the user terminal 102 again.

As described above, in FIG. 10, only the user terminal 101 receives the content on the PtP channel 1, and the user terminals 102 and 103 receive the content on the PtM channel 12.

Figure 11:
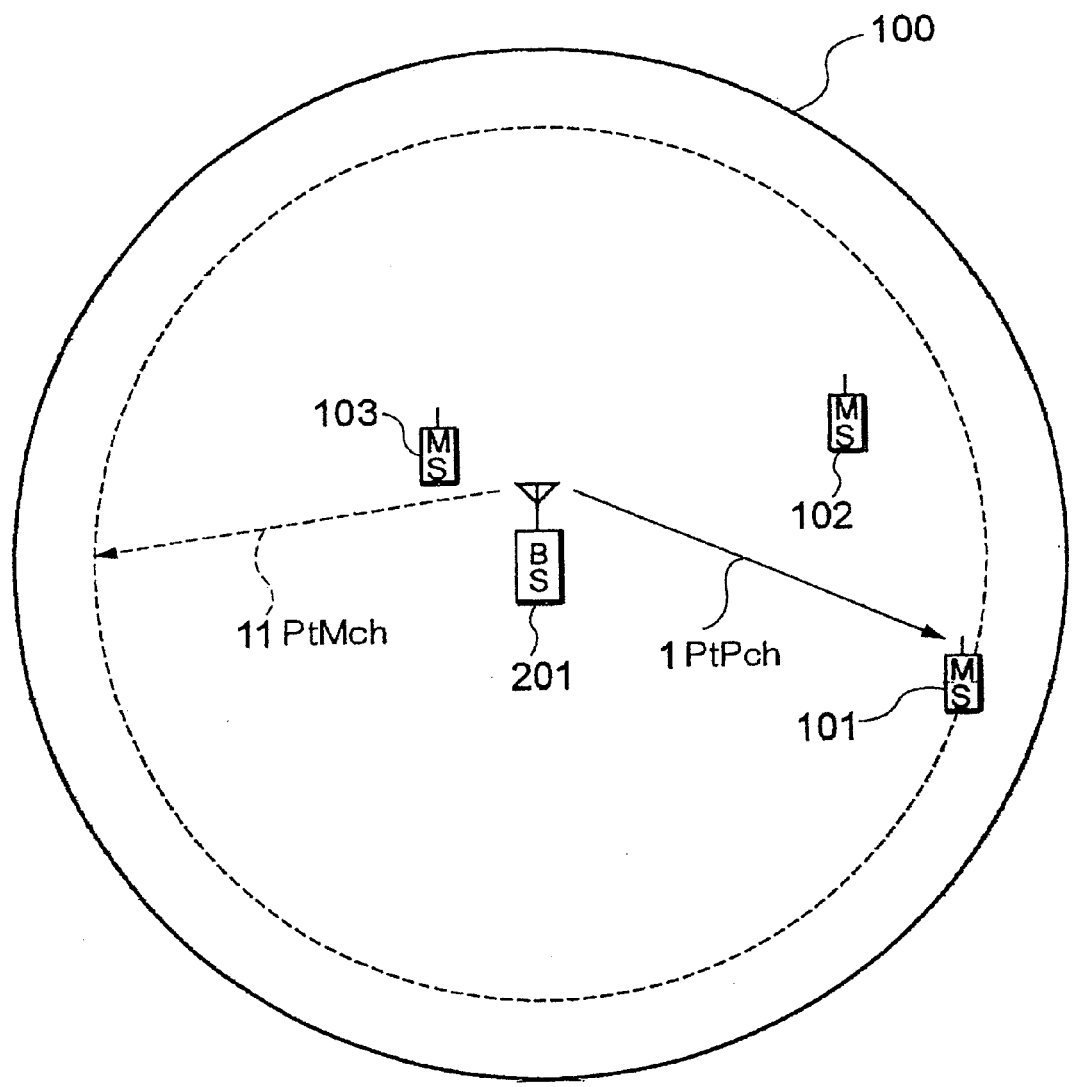
FIG. 11 is a view for explaining a state between a base station and user terminals located within the cell of the base station in the case where a channel switching process is performed in the operation of the mobile communication system according to the embodiment of the present invention.
Figure 19:
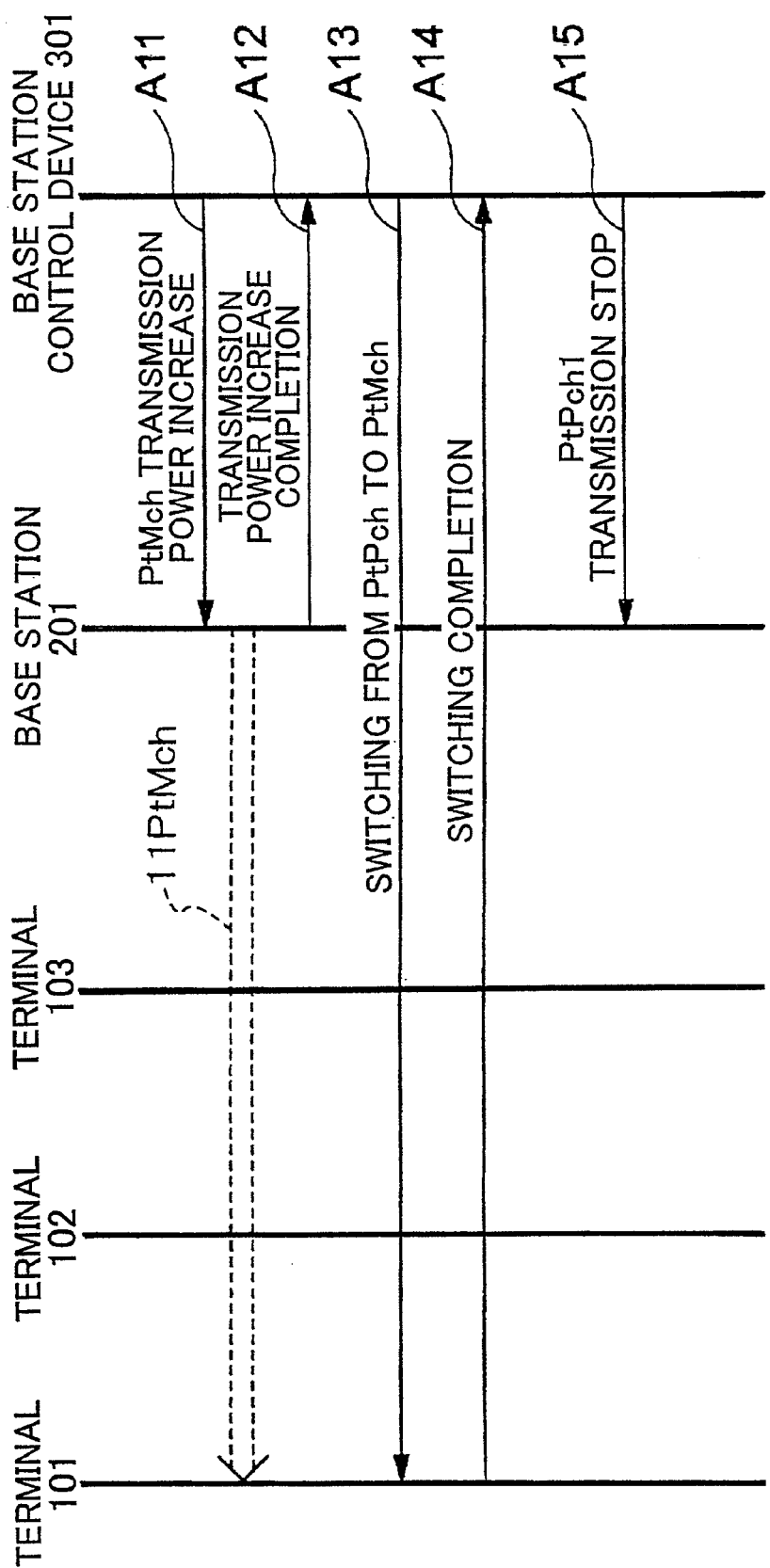
FIG. 19 is a sequence chart showing an operation of the mobile communication system according to the embodiment of the present invention in the case where the channel switching process (step S7) shown in FIG. 3 is performed under the condition shown in FIG. 10.

FIG. 19 is a sequence chart showing an operation in the case where the channel switching process of step S7 (FIG. 3) is performed under the condition shown in FIG. 10. When the channel switching process of step S7 (FIG. 3) is performed under the condition shown in FIG. 10, the base station control device 301 sends a PtM channel transmission power increase message to the base station 201, as shown in FIG. 19 (step A11). The PtM channel transmission power increase message in this case is a message for increasing the transmission power of PtM channel 12 so as to allow the PtM channel 12 to reach the user terminal 101. Upon receiving the transmission power increase message, the base station 201 increases the transmission power of the PtM channel 12. As a result, the PtM channel 11 that reaches the user terminal 101 is generated as shown in FIG. 11. Since the transmission power of the PtM channel 11 that reaches the user terminal 101 has been already estimated in step S5 of FIG. 2, the base station 201 can generate the PtM channel 11 by increasing the transmission power of the PtM channel 12 based on the estimated transmission power of the PtM channel 11.

After generating the PtM channel 11, the base station 201 returns a transmission power increase completion message to the base station control device 301 (step A12). In response to the transmission power increase completion message, the base station control device 301 sends, to the user terminal 102, a switching instruction massage for instructing the user terminal 101 to receive the content not on the PtP channel 1, but on the PtM channel 11 (step A13). Upon receiving the switching instruction message, the user terminal 101 starts an operation of receiving the content on the PtM channel 11 and returns a switching completion message to the base station control device 301 after confirming that the content can normally be received on the PtM channel 11 (step A14).

Figure 12:
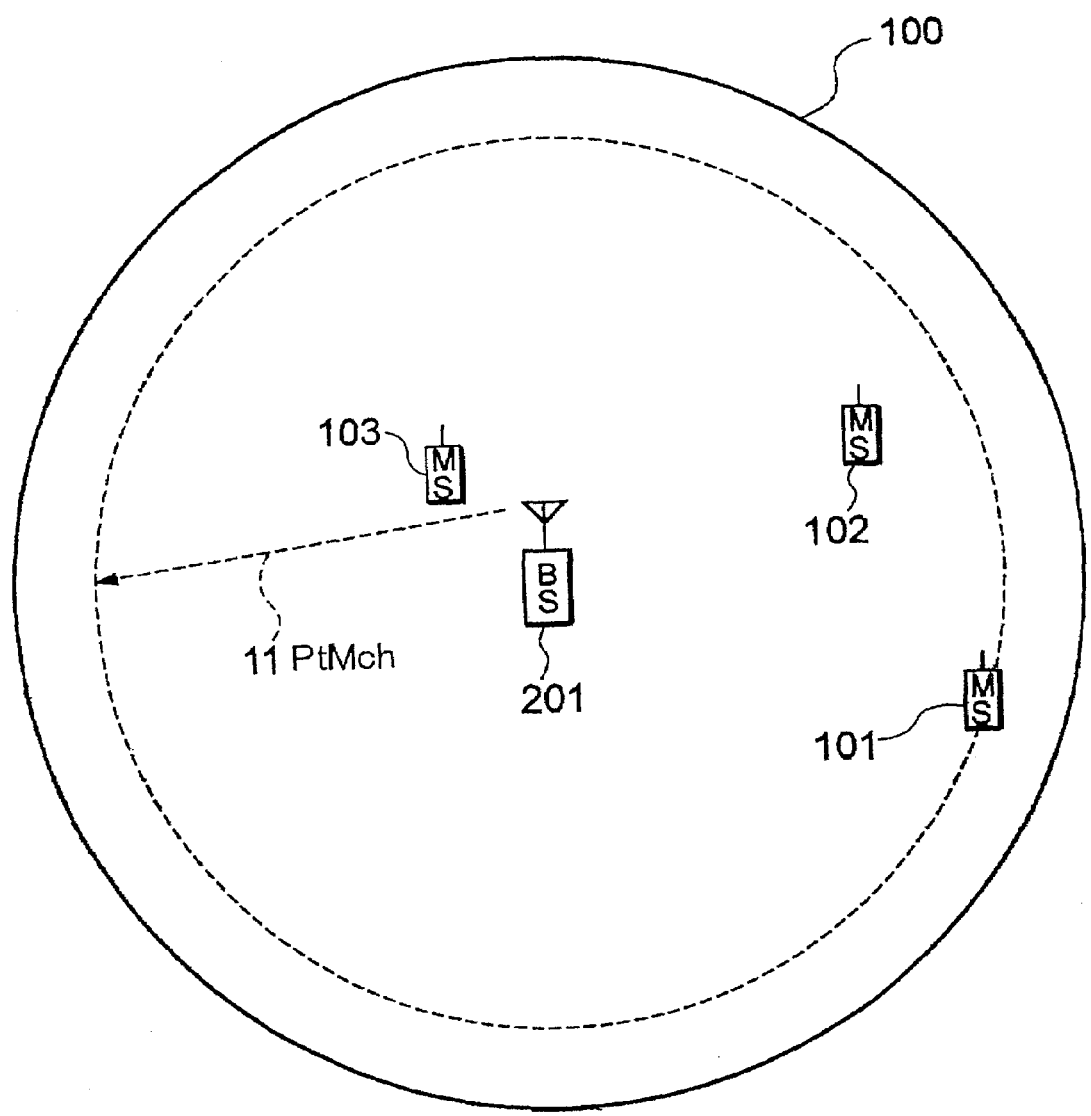
FIG. 12 is a view for explaining a state between a base station and user terminals located within the cell of the base station in the case where a channel switching process is performed in the operation of the mobile communication system according to the embodiment of the present invention.

Upon receiving the switching completion message, the base station control device 301 sends a PtP channel transmission stop message for canceling the PtP channel 1 to the base station 201 (step A15). Upon receiving the transmission stop message, the base station 201 stops the transmission of the PtP channel 1. As a result, the radio channel used for the content distribution to the user terminal 101 is switched from the PtP channel 1 to PtM channel 11, and all the user terminals 101 to 103 receive the content on the PtM channel 11, as shown in FIG. 12.

The base station 201 or base station control device 301 may send an inquiry message for inquiring of the user terminal 101 whether or not the stop of the content reception on the PtP channel 1 and the start of the content reception on the PtM channel 11 are possible before the transmission of the switching instruction message in step A13. In this case, the base station 201 or base station control device 301 sends the switching instruction message at the time point when receiving an OK reply from the user terminal 101.

However, when receiving a reply indicating that it is impossible to perform a normal content reception from the user terminal 101 as a result of the inquiry message, the base station 201 or base station control device 301 rearranges the transmission power of the PtM channel 11 based on the current transmission power of the PtP channel 1, the current reception power of the PtP channel 1 measured by the user terminal 101, and the like. After the rearrangement of the transmission power of the PtM channel 11, the base station 201 or base station control device 301 sends an inquiry message to the user terminal 101 again.

In the channel switching process of step S7 (FIG. 3), a plurality of PtP channels currently used for the content distribution to a plurality of user terminals may be switched to the PtM channel at a time. It goes without saying that the channel switching process of step S7 (FIG. 3) performed for a plurality of user terminals needs to be carried out such that the total of the downlink transmission power of the base station 201 does not exceed the upper limit while the PtM channel is set with the plurality of PtP channels maintained.

Figure 23:
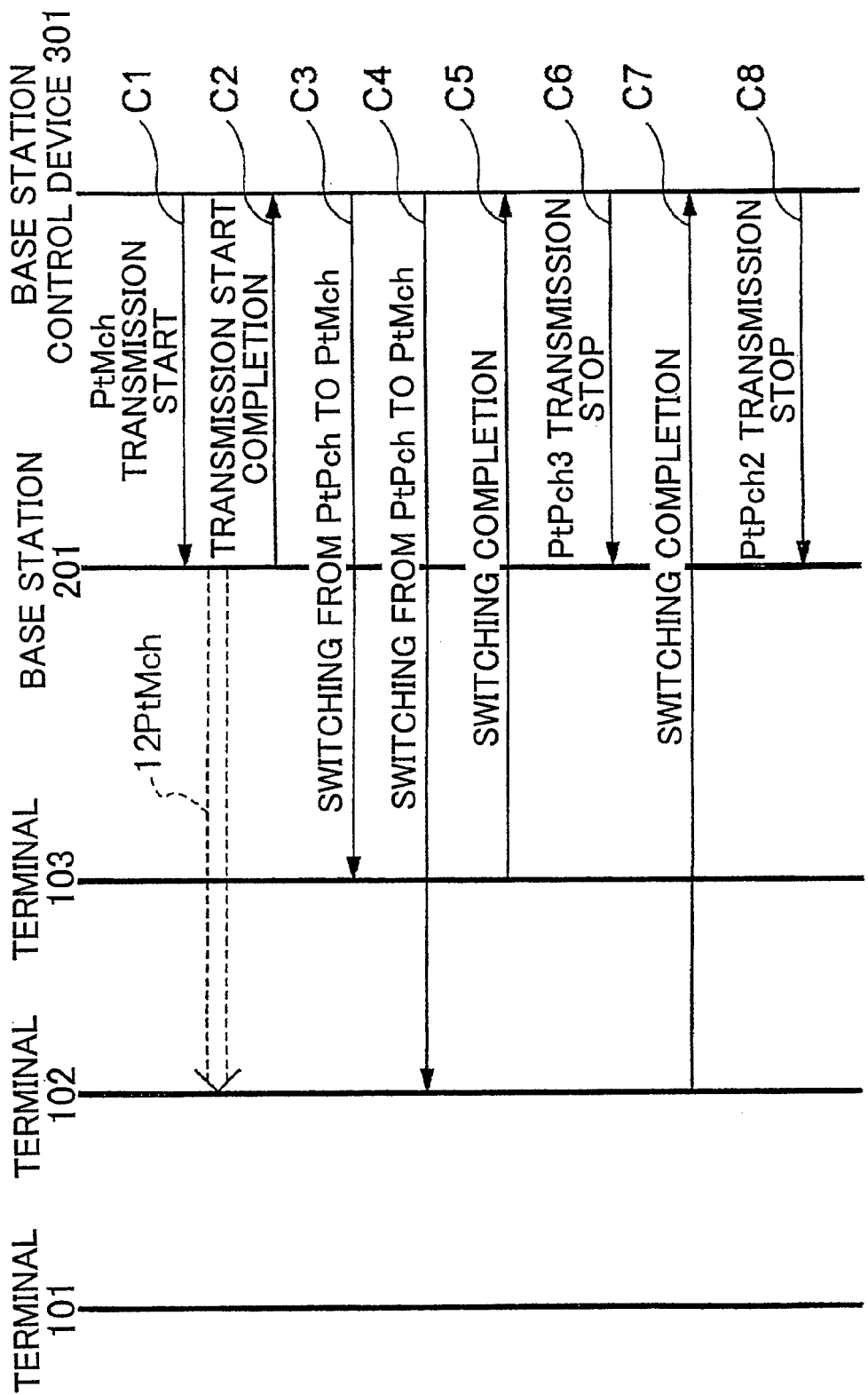
FIG. 23 is a sequence chart showing an operation of the mobile communication system according to the embodiment of the present invention in the case where the channel switching process (step S7) shown in FIG. 3 is performed under the condition shown in FIG. 6.

A case where the channel switching process of step S7 (FIG. 3) is performed for the user terminals 102 and 103 under the condition shown in FIG. 6 will be described. FIG. 23 is a sequence chart showing an operation in the case where the channel switching process of step S7 (FIG. 3) is performed for the user terminals 102 and 103 under the condition shown in FIG. 6. This process is performed after estimating the transmission power of the PtM channel that reaches the user terminal 102 in step S5 of FIG. 2, comparing the estimated transmission power and the margin power (Mgn_PW) in the cell 100 in step S6 of FIG. 3, and confirming that the estimated transmission power is not more than the margin power (Mgn_PW).

Figure 13:
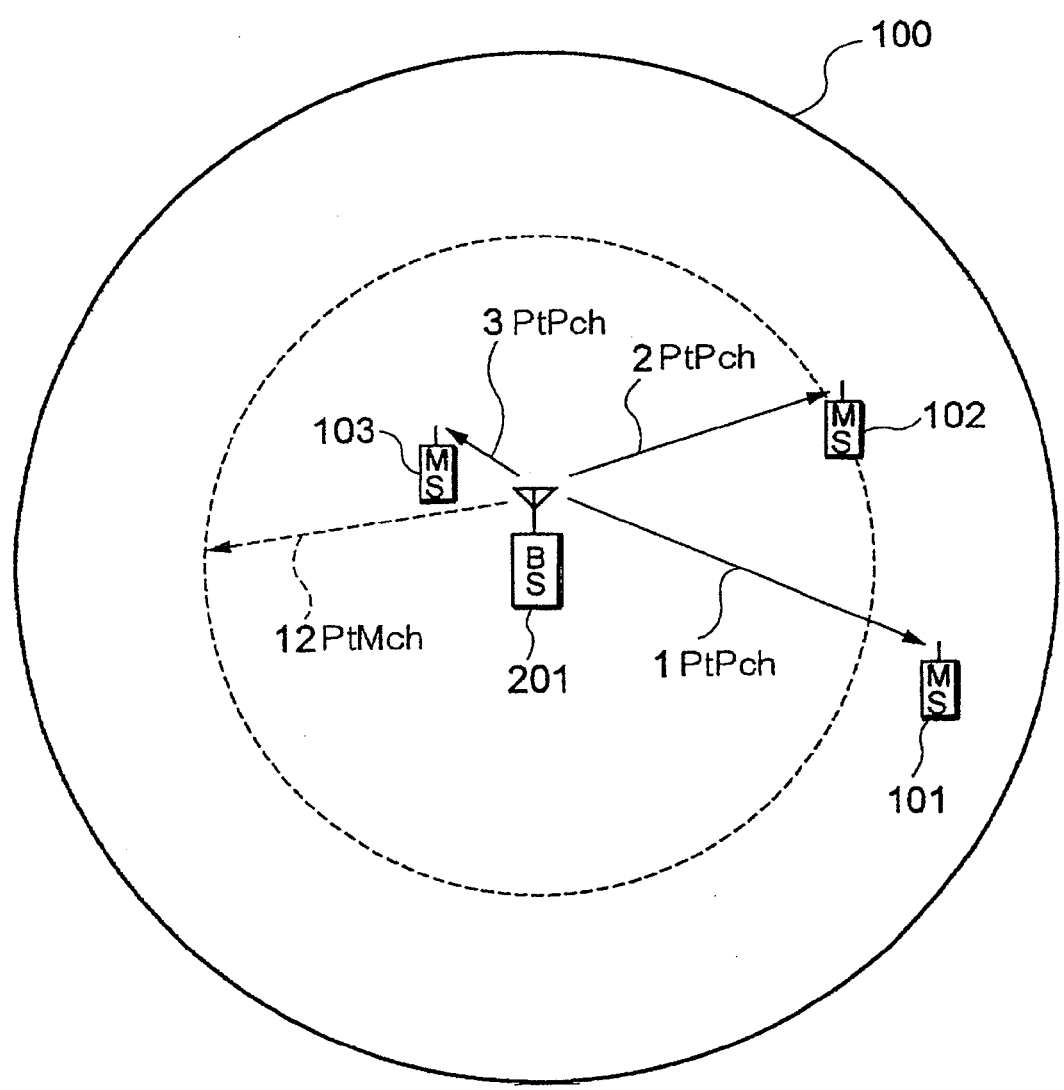
FIG. 13 is a view for explaining a state between a base station and user terminals located within the cell of the base station in the case where a channel switching process is performed in the operation of the mobile communication system according to the embodiment of the present invention.

When the channel switching process of step S7 (FIG. 3) is performed for the user terminals 102 and 103 under the condition shown in FIG. 6, the base station control device 301 sends a PtM channel transmission start message to the base station 201 to allow the base station 201 to start the transmission of PtM channel 12 (see FIG. 13) that reaches the user terminal 102, as shown in FIG. 23 (step C1). Upon receiving the PtM channel transmission start message, the base station 201 starts the transmission of the PtM channel 12 while maintaining the PtP channels 2 and 3 as shown in FIG. 13 and returns a transmission start completion message to the base station control device 301 (step C2).

Upon receiving the transmission start completion message, the base station control device 301 sends switching instruction messages to the user terminals 102 and 103 to instruct the user terminals 102 and 103 to receive the content not on the PtP channels 2 and 3 but on the PtM channel 12 (steps C3 and C4). Upon receiving the switching instruction messages, the user terminals 102 and 103 start operations of receiving the content on the PtM channel 12 and return switching completion messages to the base station control device 301 after confirming that the content can normally be received on the PtM channel 12 (steps C5 and C7).

Upon receiving the switching completion messages from the user terminals 102 and 103, the base station control device 301 sends PtP channel transmission stop messages for canceling the PtP channels 2 and 3 to the base station 201 (steps C6 and C8). Upon receiving the transmission stop messages, the base station 201 stops the transmission of the PtP channels 2 and 3. As a result, the radio channels used for the content distribution to the user terminals 102 and 103 are switched from the PtP channels 2 and 3 to the PtM channel 12, and the user terminals 102 and 103 receive the content on the PtM channel 12, as shown in FIG. 10.

As described above, it is possible to complete the switching process of all the PtP channels being used for the broadcast-type service in the cell 100 to the PtM channel more quickly by switching a plurality of PtP channels to the PtM channel at a time.

A case where the channel switching process of step S7 (FIG. 3) is performed for the user terminals 101 to 103 that receive the broadcast-type service in the cell 100 under the condition shown in FIG. 6 will be described. This process is performed after comparing, in step S6 (FIG. 3) the margin power (Mgn_PW) in the cell 100 and the transmission power of the PtM channel 11 (see FIG. 14) that reaches the user terminal 1, which is the transmission power (Max_PtM) estimated in step S2, and confirming that the transmission power (Max_PtM) is not more than the margin power (Mgn_PW).

Figure 14:
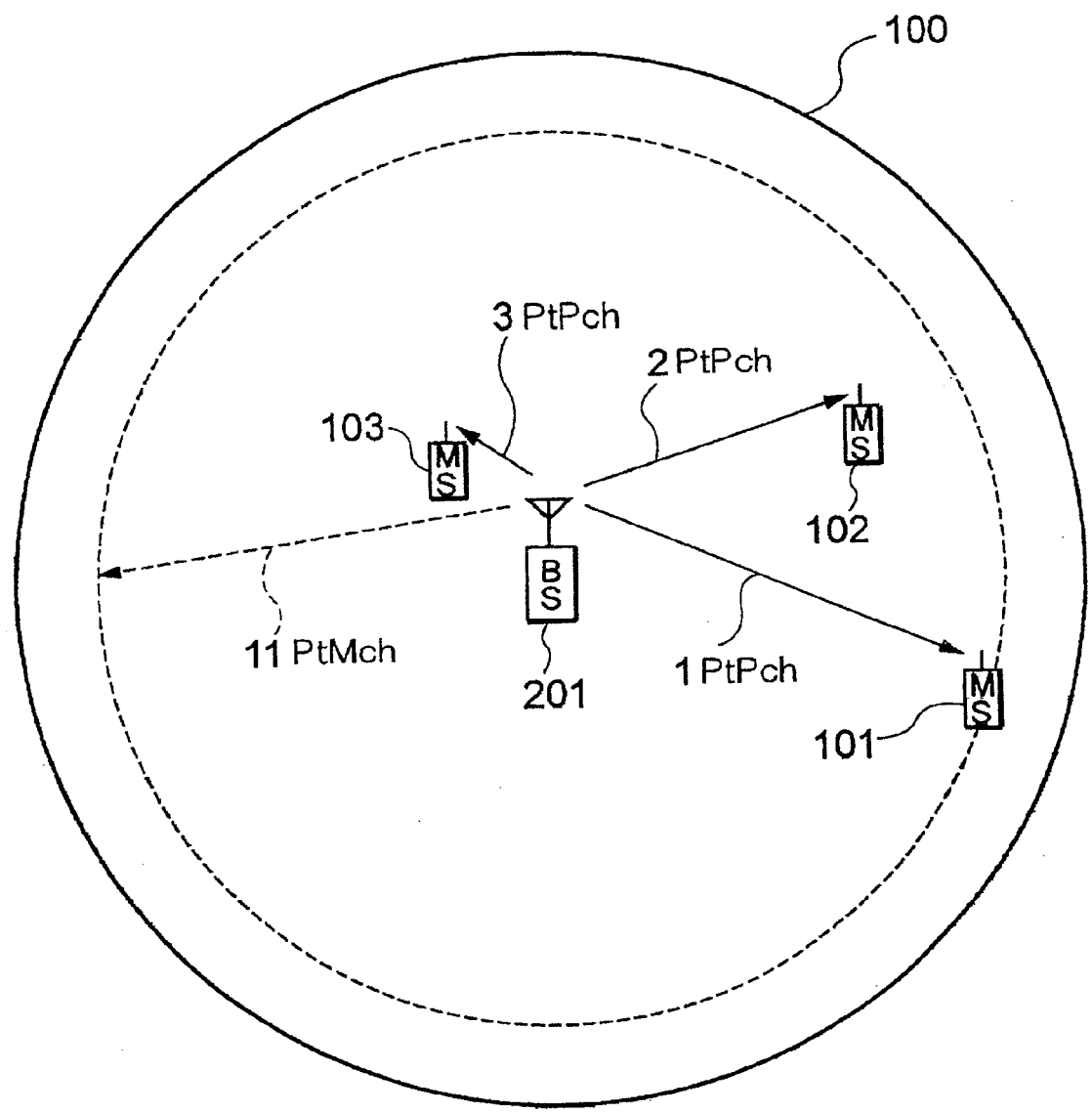
FIG. 14 is a view for explaining a state between a base station and user terminals located within the cell of the base station in the case where a channel switching process is performed in the operation of the mobile communication system according to the embodiment of the present invention.

This process can be realized by slightly modifying the procedure shown in FIG. 23. When the channel switching process of step S7 (FIG. 3) is performed for the user terminals 101 to 103 under the condition shown in FIG. 6, the base station control device 301 sends a transmission start message to the base station 201 to allow the base station 201 to start the transmission of PtM channel 11 (see FIG. 14) that reaches the user terminal 101 in step C1. Therefore, the base station 201 starts the transmission of PtM channel 11 while maintaining the PtP channels 1 to 3 as shown in FIG. 14.

At the time when sending the switching instruction messages in steps C3 and C4, the base station control device 301 also sends, to the user terminal 101, a switching instruction message for instructing the user terminal 101 to receive the content not on the PtP channel 1, but on the PtM channel 11. Accordingly, the user terminals 101 to 103 start operations of receiving the content on the PtM channel 11, and the user terminal 101 returns a switching completion message to the base station control device 301 after confirming that the content can normally be received on the PtM channel 11, like the user terminals 102 and 103.

The base station control device 301 sends, to the base station 201, transmission stop messages for canceling the PtP channels 2 and 3 in steps C6 and C8 and, at the same time, sends, to the base station 201, another transmission stop message for canceling the PtP channel 1 in response to the switching completion message from the user terminal 101. The base station 201 accordingly stops the PtP channels 1 to 3. As a result, the radio channels used for the content distribution to the user terminals 101 and 103 are switched from the PtP channels 1 to 3 to the PtM channel 11, and the user terminals 101 to 103 receive the content on the PtM channel 11 as shown in FIG. 12.

When the base station 201 starts the transmission of the PtM channel while maintaining the PtP channel, the PtM channel is transmitted with a transmission power previously estimated as described above. In this case, a margin may be added to the estimated transmission power. By this, even when the user terminal that receives the PtM channel moves away from the base station 201, it can receive the PtM channel. When the user terminal that receives the content on the PtM channel detects an error in the reception data, it may send an error detection notification to the base station 201. In this case, the base station 201 increases the transmission power of the PtM channel in response to the error detection notification.

Figure 15:
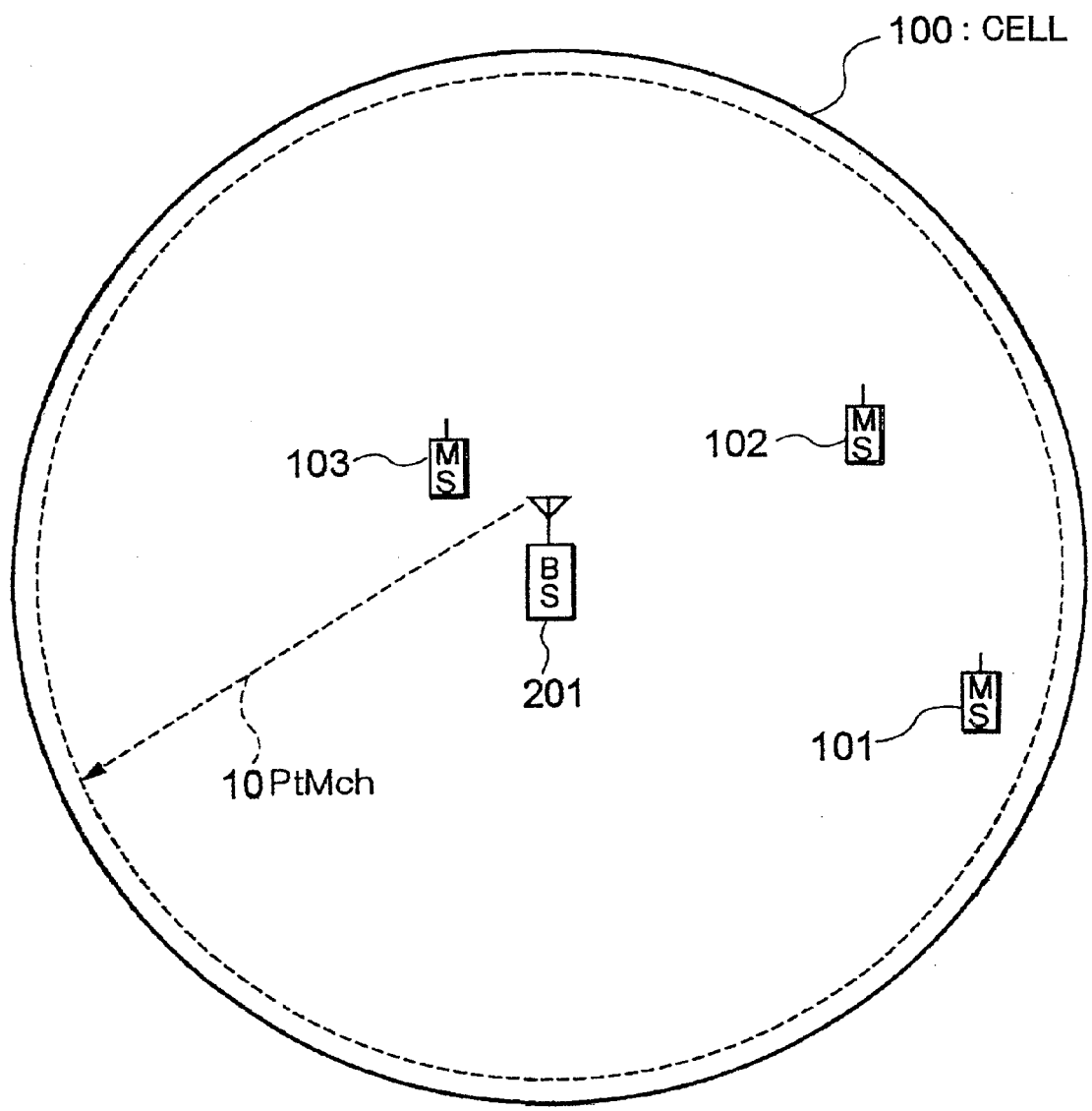
FIG. 15 is a view for explaining a state between a base station and user terminals located within the cell of the base station in the case where a channel switching process is performed in the operation of the mobile communication system according to the embodiment of the present invention.
Figure 16:
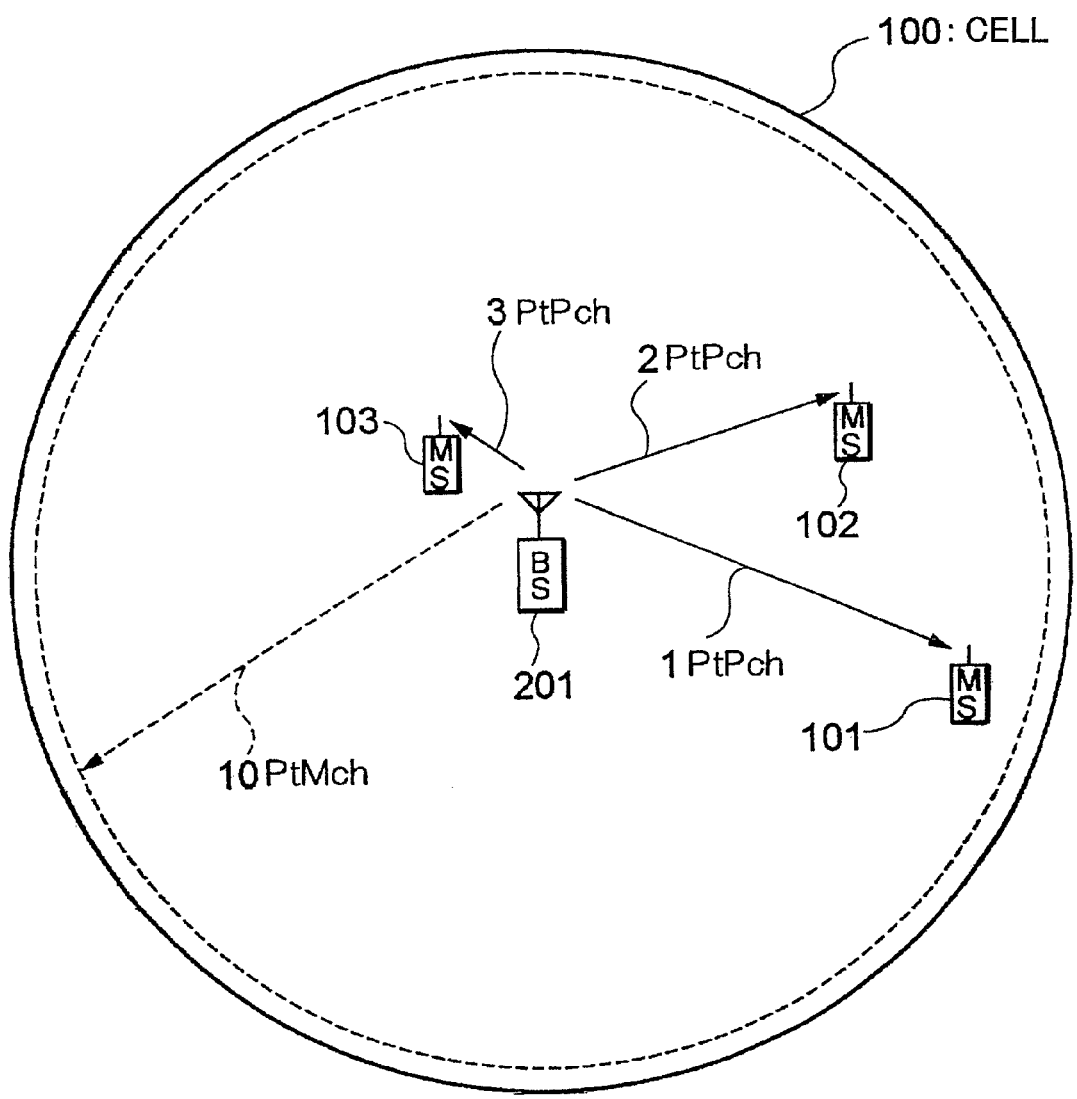
FIG. 16 is a view for explaining a state between a base station and user terminals located within the cell of the base station in the case where a channel switching process is performed in the operation of the mobile communication system according to the embodiment of the present invention.

In the channel switching process of step S7 (FIG. 3) performed for all the user terminals 101 to 103, the base station 201 may start the transmission of the PtM channel 10 having a transmission power higher than one of the PtM channel 11 as shown in FIG. 16 instead of starting the transmission of the PtM channel 11 as shown in FIG. 14, while maintaining the PtP channels 1 to 3. In this case, the radio channels used for the content distribution to the user terminals 101 to 103 are switched from the PtP channels 1 to 3 to the PtM channel 10, and the user terminal 101 to 103 receive the content on the PtM channel 10 as shown in FIG. 15.

The base station 201 may increase the transmission power of the PtM channel 11 after the radio channels of the user terminals 101 to 103 have been switched to the PtM channel 11 as shown in FIG. 12 as a result of the channel switching process of step S7 (FIG. 3) performed in the condition shown in FIG. 10 or the channel switching process of step S7 (FIG. 3) performed for all the user terminals 101 to 103, to thereby generate the PtM channel 10 as shown in FIG. 15. It goes without saying that the total of the downlink transmission power of the base station 201 should not exceed the upper limit even in the case where the PtM channel 10 that reaches near the boundary of the cell 100 is generated as described above.

Next, details of the channel switching process of step S9 (FIG. 3) will be described with reference to the drawings.

Figure 20:
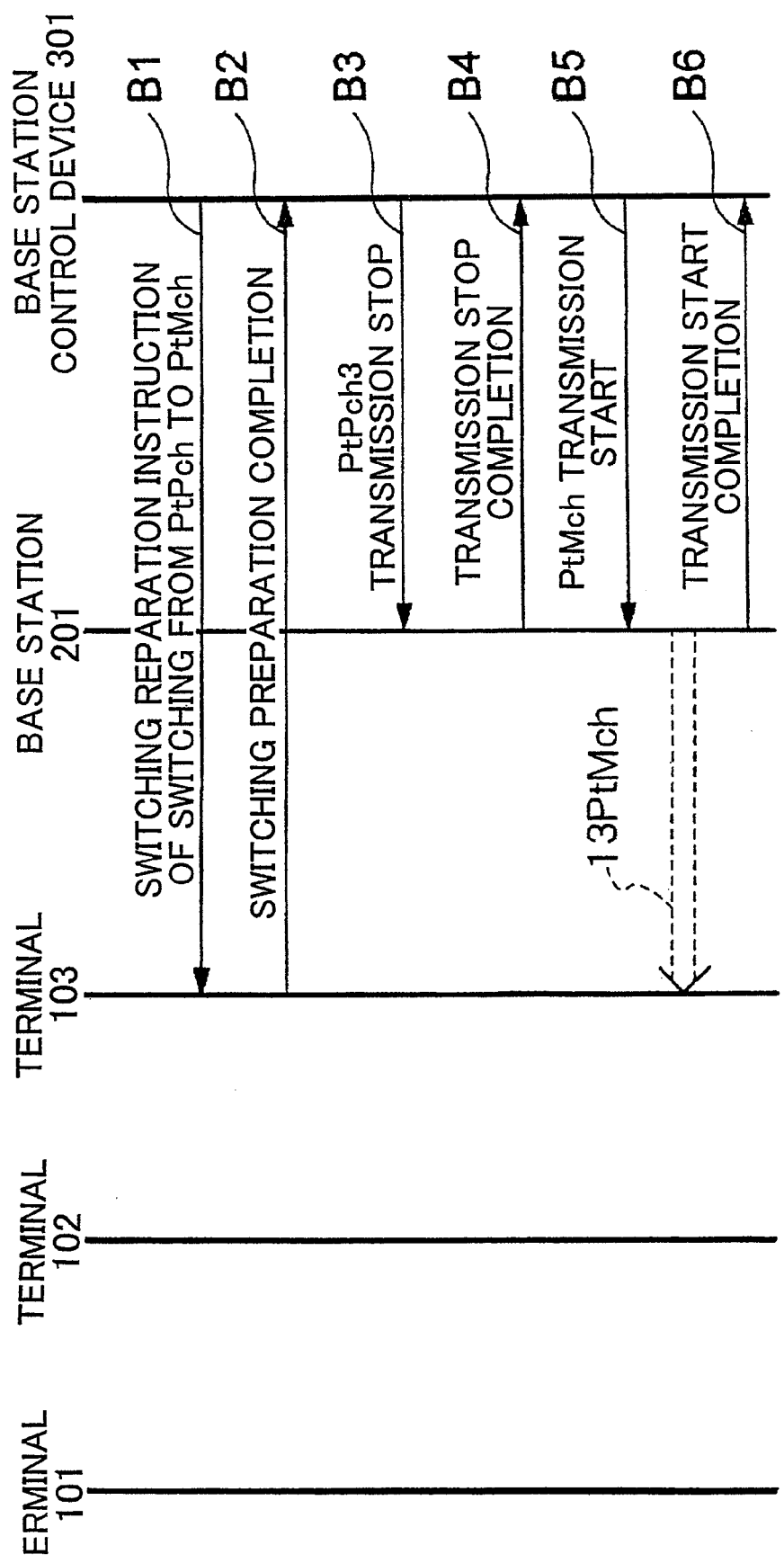
FIG. 20 is a sequence chart showing an operation of the mobile communication system according to the embodiment of the present invention in the case where the channel switching process (step S9) shown in FIG. 3 is performed under the condition shown in FIG. 6.

FIG. 20 is a sequence chart showing an operation in the case where the channel switching process of step S9 (FIG. 3) is performed under the condition shown in FIG. 6. When the channel switching process of step S9 (FIG. 3) is performed under the condition shown in FIG. 6, the base station control device 301 sends, to the user terminal 103, a switching preparation instruction message for instructing the user terminal 103 to cancel the content reception operation on the PtP channel 3 and to perform preparation of receiving the content on the PtM channel 13 (see FIG. 8) that reaches the user terminal 103, as shown in FIG. 20 (step B1). The switching preparation instruction message includes information related to time at which the PtM channel 13 can be received.

Upon receiving the switching preparation instruction message, the user terminal 103 returns a switching preparation completion message to the base station control device 301 (step B2).

In response to the switching preparation completion message, the base station control device 301 sends, to the base station 201, a transmission stop message for canceling the PtP channel 3 (step B3). Upon receiving the transmission stop message, the base station 201 stops the transmission of the PtP channel 3. After that, the base station 201 returns a transmission stop completion message to the base station control device 301 (step B4).

Upon receiving the transmission stop completion message, the base station control device 301 sends, to the base station 201, a transmission start message for instructing the base station 201 to start the transmission of the PtM channel 13 that reaches the user terminal 103 (step B5). In response to the transmission start message, the base station 201 starts the transmission of the PtM channel 13 as shown in FIG. 8 and returns a transmission start completion message to the base station control device 301 (step B6).

The user terminal 103 starts an operation of receiving the content on the PtM channel 13 at the time specified by the switching preparation instruction message. As a result, the radio channel used for the content distribution to the user terminal 103 is switched from the PtP channel 3 to the PtM channel 13, and the user terminal 103 receives the content on the PtM channel 13 as shown in FIG. 8.

Figure 21:
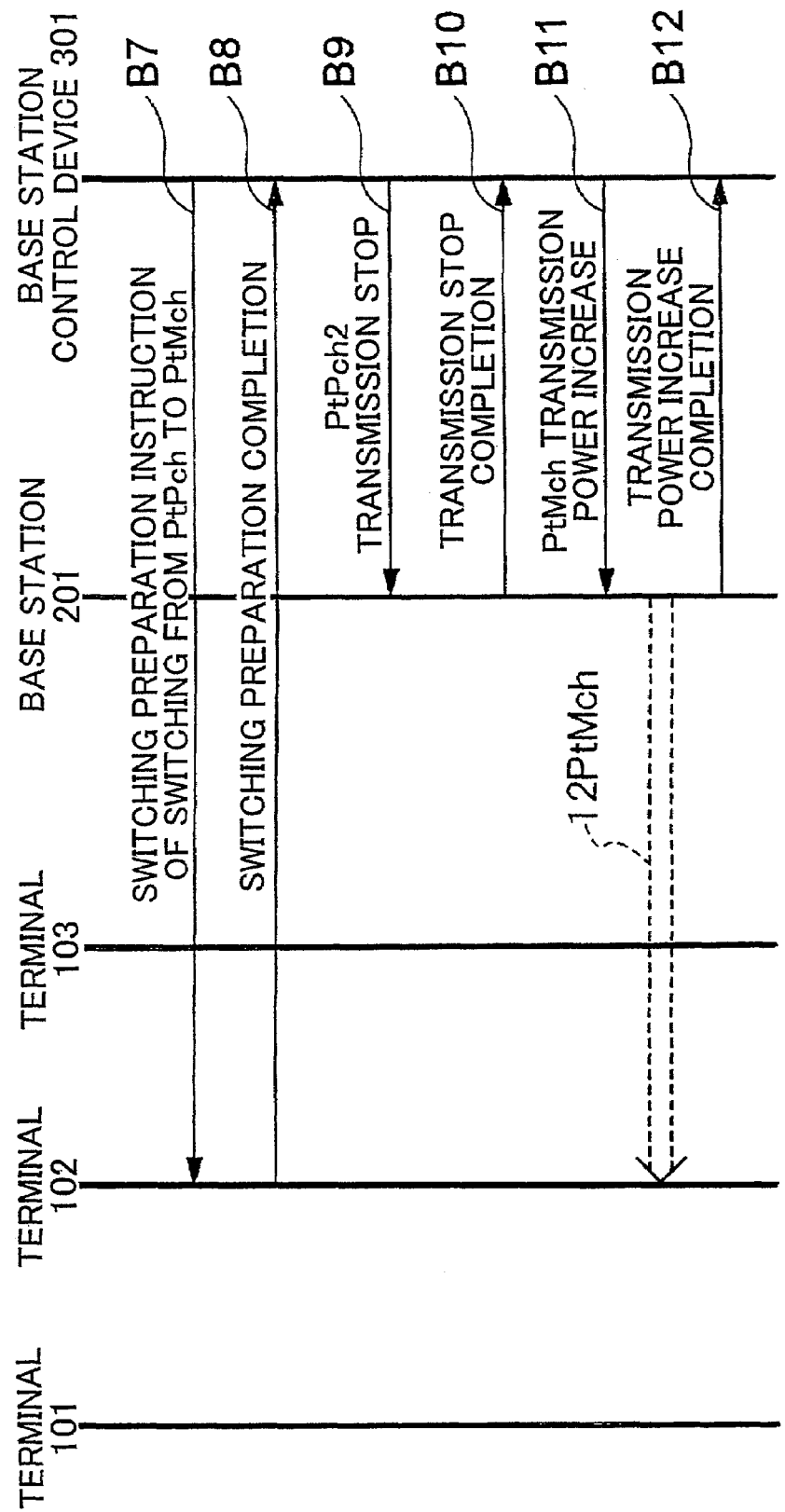
FIG. 21 is a sequence chart showing an operation of the mobile communication system according to the embodiment of the present invention in the case where the channel switching process (step S9) shown in FIG. 3 is performed under the condition shown in FIG. 8.

FIG. 21 is a sequence chart showing an operation in the case where the channel switching process of step S9 (FIG. 3) is performed under the condition shown in FIG. 8. When the channel switching process of step S9 (FIG. 3) is performed under the condition shown in FIG. 8, the base station control device 301 sends, to the user terminal 102, a switching preparation instruction message for instructing the user terminal 102 to cancel the content reception operation on the PtP channel 2 and to perform preparation of receiving the content on the PtM channel 12 (see FIG. 10) that reaches the user terminal 102, as shown in FIG. 21 (step B7). The switching preparation instruction message includes information related to time at which the PtM channel 12 can be received. Upon receiving the switching preparation instruction message, the user terminal 102 returns a switching preparation completion message to the base station control device 301 (step B8).

In response to the switching preparation completion message, the base station control device 301 sends, to the base station 201, a transmission stop message for canceling the PtP channel 2 (step B9). Upon receiving the transmission stop message, the base station 201 stops the transmission of the PtP channel 2. After that, the base station 201 returns a transmission stop completion message to the base station control device 301 (step B10).

Upon receiving the transmission stop completion message, the base station control device 301 sends, to the base station 201, a transmission power increase message for increasing the transmission power of the PtM channel 13 so that the PtM channel 13 can reach the user terminal 102 (step B11). Upon receiving the transmission power increase message, the base station 201 increases the transmission power of the PtM channel 13. As a result, the PtM channel 12 that reaches the user terminal 102 is generated as shown in FIG. 10. After that, the base station 201 returns a transmission power increase completion message to the base station control device 301 (step B12).

The user terminal 102 starts an operation of receiving the content on the PtM channel 12 at the time specified by the switching preparation instruction message. As a result, the radio channel used for the content distribution to the user terminal 102 is switched from the PtP channel 2 to the PtM channel 12, and the user terminals 102 and 103 receive the content on the PtM channel 12 as shown in FIG. 10.

Figure 22:
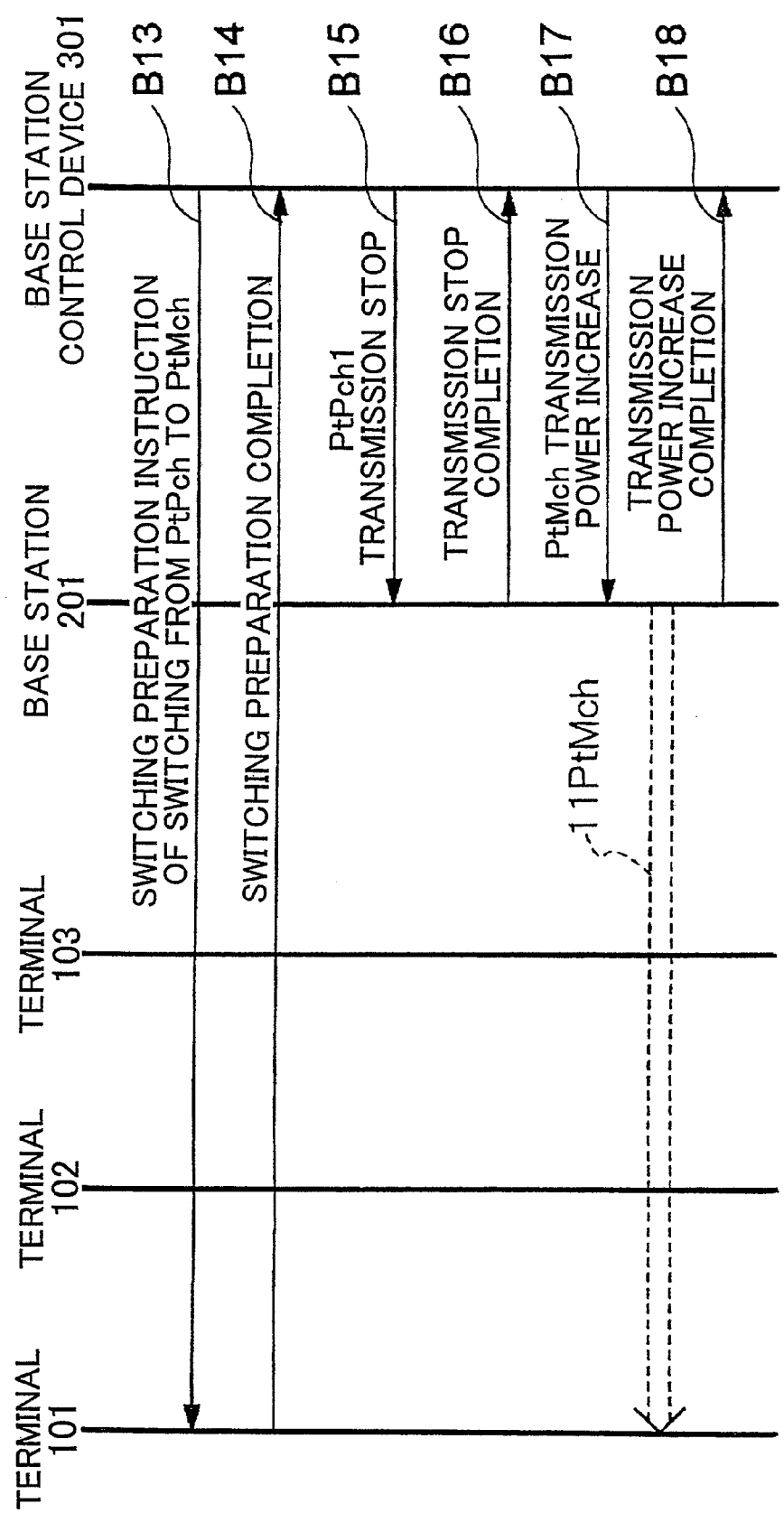
FIG. 22 is a sequence chart showing an operation of the mobile communication system according to the embodiment of the present invention in the case where the channel switching process (step S9) shown in FIG. 3 is performed under the condition shown in FIG. 10.

FIG. 22 is a sequence chart showing an operation in the case where the channel switching process of step S9 (FIG. 3) is performed under the condition shown in FIG. 10. When the channel switching process of step S9 (FIG. 3) is performed under the condition shown in FIG. 10, the base station control device 301 sends, to the user terminal 101, a switching preparation instruction message for instructing the user terminal 101 to cancel the content reception operation on the PtP channel 1 and to perform preparation of receiving the content on the PtM channel 11 (see FIG. 12) that reaches the user terminal 101, as shown in FIG. 22 (step B13). The switching preparation instruction message includes information related to time at which the PtM channel 11 can be received. Upon receiving the switching preparation instruction message, the user terminal 101 returns a switching preparation completion message to the base station control device 301 (step B14).

In response to the switching preparation completion message, the base station control device 301 sends, to the base station 201, a transmission stop message for canceling the PtP channel 1 (step B15). Upon receiving the transmission stop message, the base station 201 stops the transmission of the PtP channel 1. After that, the base station 201 returns a transmission stop completion message to the base station control device 301 (step B16).

Upon receiving the transmission stop completion message, the base station control device 301 sends, to the base station 201, a transmission power increase message for increasing the transmission power of the PtM channel 12 so that the PtM channel 12 can reach the user terminal 101 (step B17). Upon receiving the transmission power increase message, the base station 201 increases the transmission power of the PtM channel 12. As a result, the PtM channel 11 that reaches the user terminal 101 is generated as shown in FIG. 12. After that, the base station 201 returns a transmission power increase completion message to the base station control device 301 (step B18).

The user terminal 101 starts an operation of receiving the content on the PtM channel 11 at the time specified by the switching preparation instruction message. As a result, the radio channel used for the content distribution to the user terminal 101 is switched from the PtP channel 1 to the PtM channel 11, and the user terminals 101 to 103 receive the content on the PtM channel 11 as shown in FIG. 12.

Next, details of the channel switching process of step S10 (FIG. 3) will be described with reference to the drawings.

Figure 24:
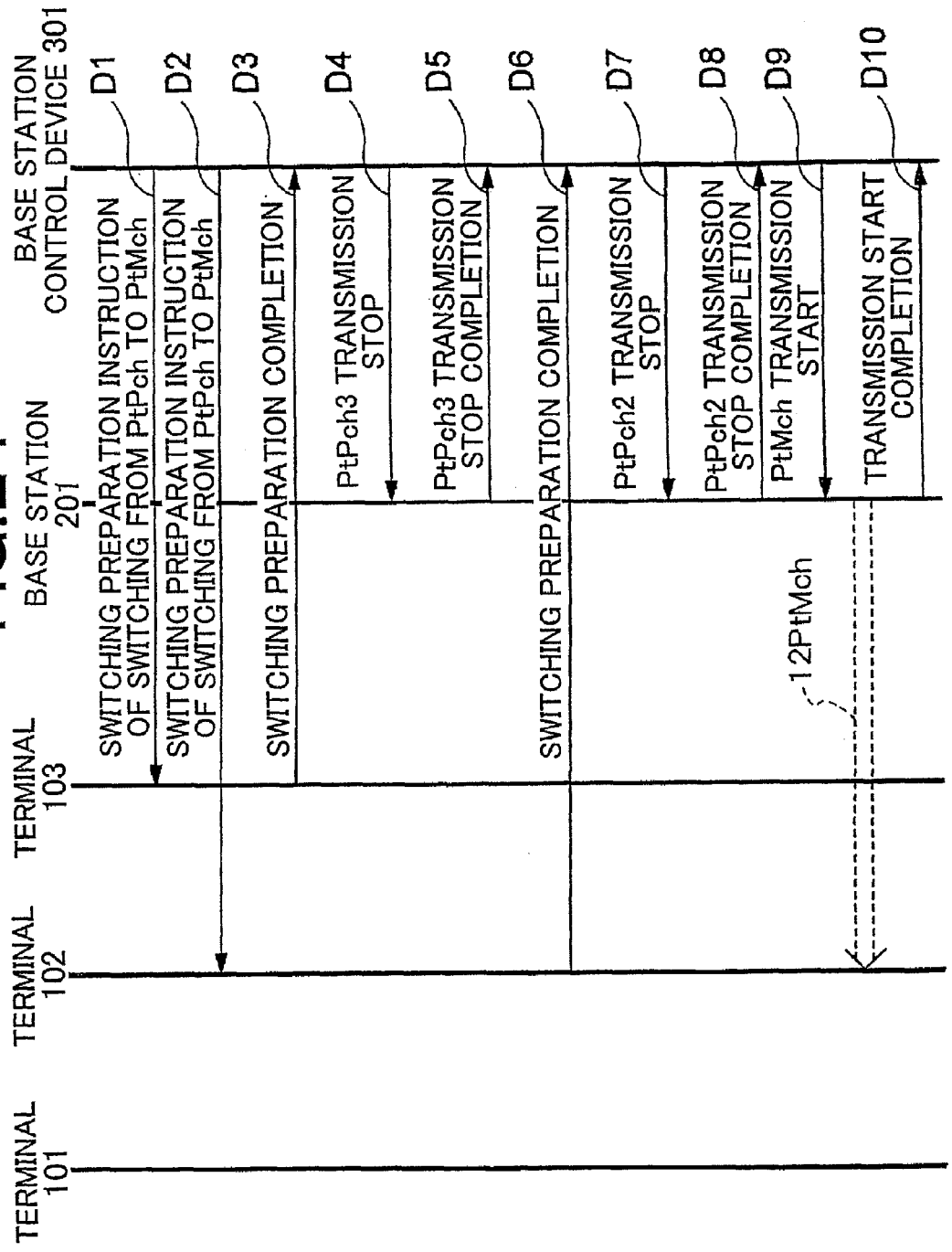
FIG. 24 is a sequence chart showing an operation of the mobile communication system according to the embodiment of the present invention in the case where the channel switching process (step S10) shown in FIG. 3 is performed under the condition shown in FIG. 16.

FIG. 24 is a sequence chart showing an operation in the case where the channel switching process of step S10 (FIG. 3) (process in which PtP channels 2 and 3 are switched to PtM channel at a time) is performed under the condition shown in FIG. 6. When the channel switching process of step S10 (FIG. 3) is performed under the condition shown in FIG. 6, the base station control device 301 sends, to the user terminals 102 and 103, switching preparation instruction messages for instructing the user terminals 102 and 103 to cancel the content reception operations on the PtP channels 2 and 3 and to perform preparations of receiving the content on the PtM channel 12 (see FIG. 10) that reaches the user terminal 102, as shown in FIG. 24 (steps D1 and D2). The switching preparation instruction messages include information related to time at which the PtM channel 12 can be received. Upon receiving the switching preparation instruction messages, the user terminals 102 and 103 return switching preparation completion messages to the base station control device 301 (steps D3 and D6).

In response to the switching preparation completion messages from the user terminals 102 and 103, the base station control device 301 sends, to the base station 201, transmission stop messages for canceling the PtP channels 2 and 3 (steps D4 and D7). Upon receiving the transmission stop messages, the base station 201 stops the transmission of the PtP channels 2 and 3. After that, the base station 201 returns transmission stop completion messages to the base station control device 301 (steps D5 and D8).

Upon receiving the transmission stop completion messages, the base station control device 301 sends, to the base station 201, a transmission start message for instructing the base station 201 to start the transmission of the PtM channel 12 that reaches the user terminal 102 (step D9). In response to the transmission start message, the base station 201 starts the transmission of the PtM channel 12 as shown in FIG. 10 and returns a transmission start completion message to the base station control device 301 (step D10).

The user terminals 102 and 103 start operations of receiving the content on the PtM channel 12 at the time specified by the switching preparation instruction messages. As a result, the radio channels used for the content distribution to the user terminals 102 and 103 are switched from the PtP channels 2 and 3 to the PtM channel 12, and the user terminals 102 and 103 receive the content on the PtM channel 12 as shown in FIG. 10.

While the PtM channel 12 is established after the cancels of the PtP channels 2 and 3 in FIG. 24, it goes without saying that the PtM channel 11 that reaches the user terminal 1 may be established after the cancels of the PtP channels 1 to 3. In this case, the PtP channels 1 to 3 are canceled in the condition shown in FIG. 6 and the PtM channel 11 that reaches the user terminal 1 is established as shown in FIG. 12, with the result that the user terminals 101 to 103 receive the content on the PtM channel 11.

Next, an operation of the mobile communication system according to the embodiment of the present invention in the case where a plurality of user terminals to receive the broadcast-type service in the cell of the base station 201 receive the content on the single PtM channel will be described with reference to the drawings.

Figure 4:
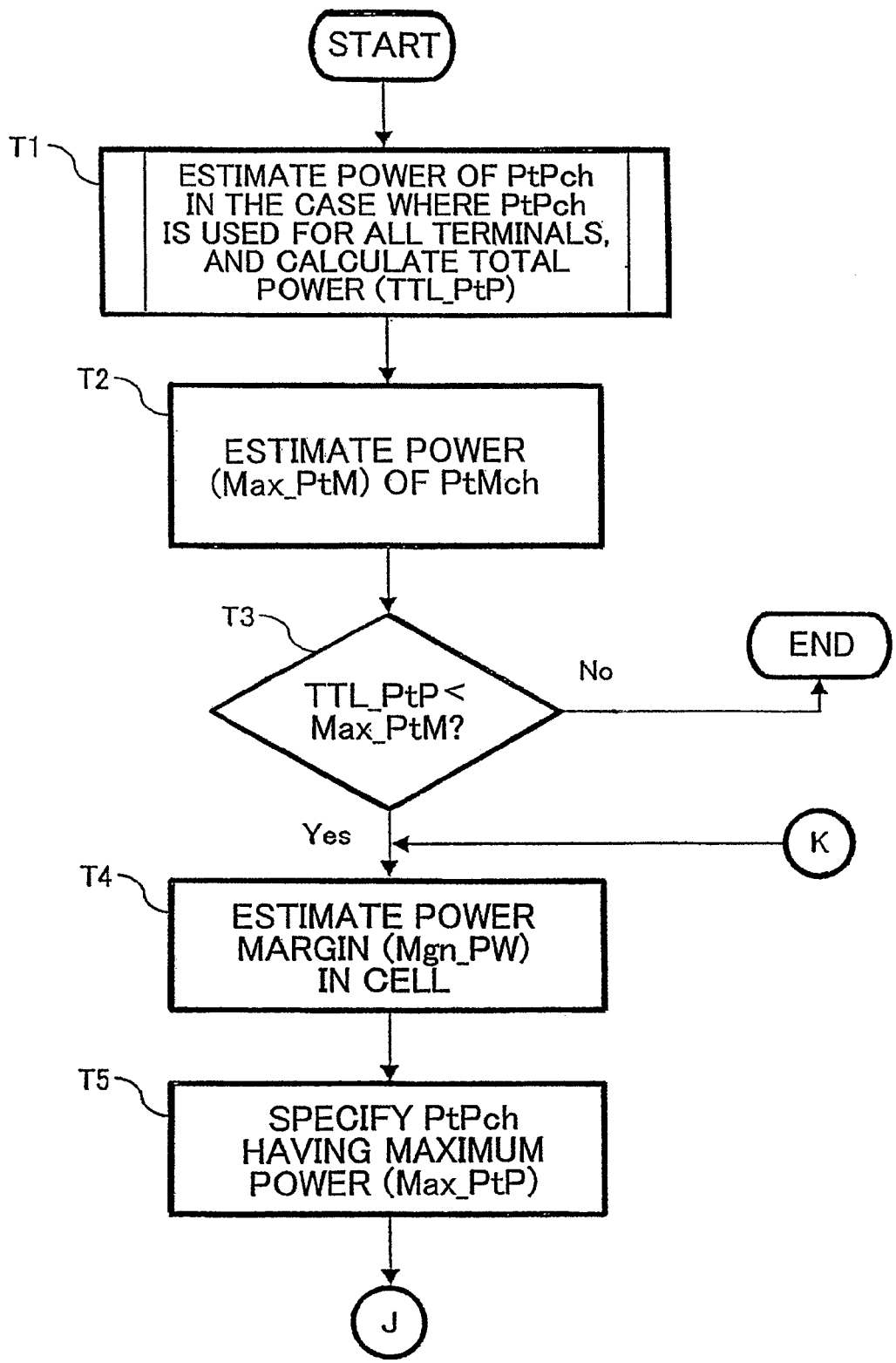
FIG. 4 is a flowchart showing an operation of the mobile communication system according to the embodiment of the present invention in the case where a PtM channel is used to provide a broadcast-type service.
Figure 5:
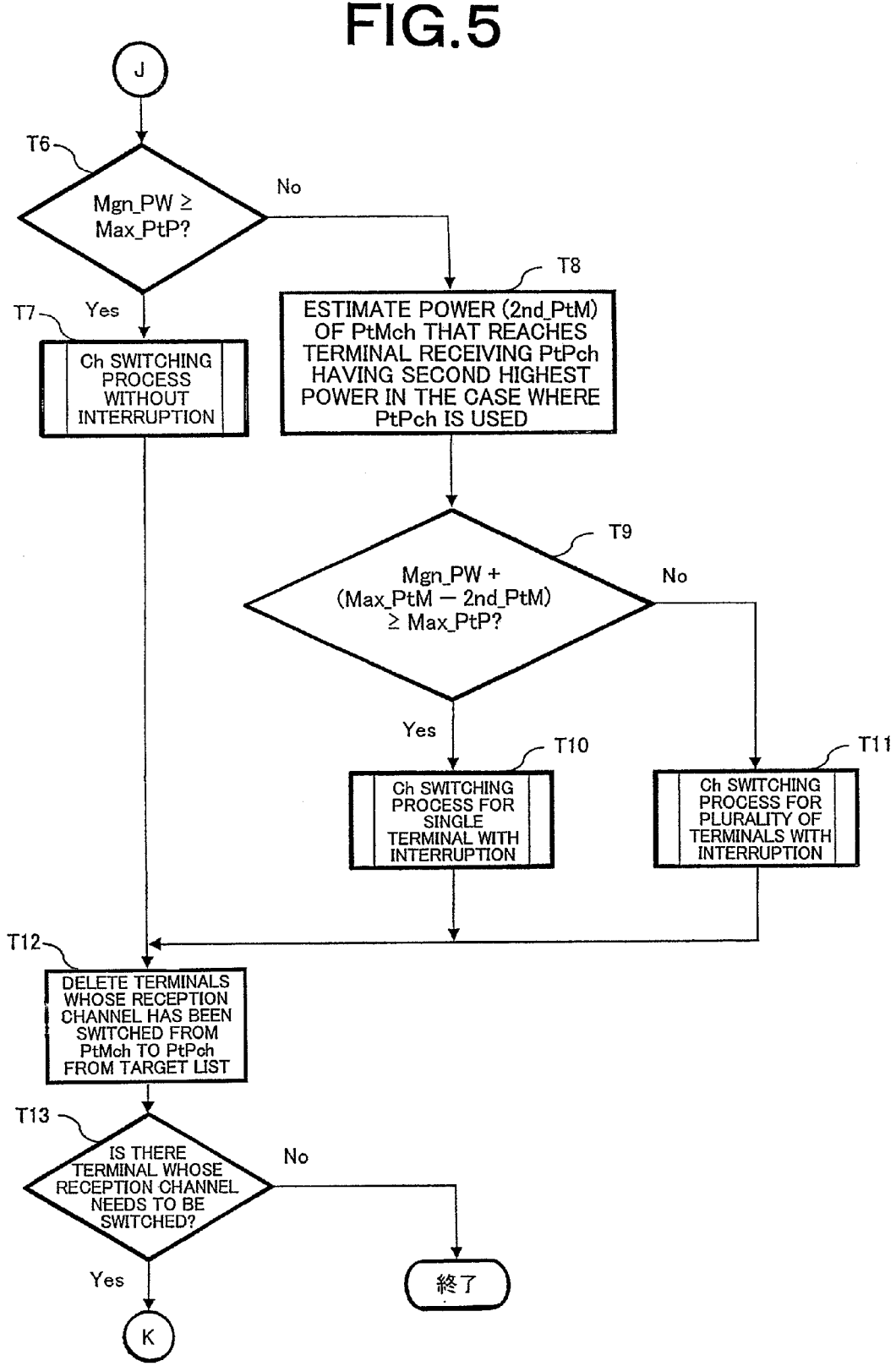
FIG. 5 is a flowchart showing an operation subsequent to the operation shown in FIG. 4.

FIGS. 4 and 5 are flowcharts showing an operation of the mobile communication system according to the embodiment of the present invention in the case where the broadcast-type service is distributed on the PtM channel.

The processing procedure shown in FIGS. 4 and 5 is activated when any user terminal that receives the broadcast-type service in the cell of the base station 201 cancels the reception of the broadcast-type service, or any user terminal that receives the broadcast-type service in the cell of the base station 201 moves outside of the cell. That is, when the number of the user terminals that receive the broadcast-type service on the PtM channel in the cell is reduced, the procedure is activated. For example, it is possible for the base station 201 and base station control device 301 to recognize the number of the user terminals that are receiving the broadcast-type service by measuring the move-in of the user terminal to the cell and move-out thereof from the cell, or by sending a request signal to request the user terminal to report the location thereof as needed and receiving the report.

Alternatively, the processing procedure shown in FIGS. 4 and 5 may be periodically activated with a predetermined interval. The reason for the above is that even when the number of the user terminals that receive the broadcast-type service on the PtM channel is not changed, the situation in which the PtM channel needs to be switched to the PtP channel depending on the location of the user terminal can occur. For example, in the case where the user terminal to receive the broadcast-type service on the PtM channel moves to the location that needs less transmission power than the previous location does (in general, in the case where the user terminal moves close to the base station antenna), the above situation can occur.

Alternatively, the processing procedure shown in FIGS. 4 and 5 may be activated when the allowable number of users that receive the broadcast-type service is increased. When the allowable number of users that receive the broadcast-type service is increased, the transmission power that can be used for distribution of the broadcast-type service is increased, with the result that the number of the user terminals that can receive the broadcast-type service on the PtP channel is increased. Accordingly, the processing procedure shown in the FIGS. 4 and 5 is activated to determine whether a switching process from the PtM channel to the PtP channel is performed.

Alternatively, the processing procedure shown in FIGS. 4 and 5 may be activated when the allowable number of users that receive the non-broadcast-type service is reduced. When the allowable number of users that receive the non-broadcast-type service is reduced, the transmission power that can be used for distribution of the broadcast-type service is increased, with the result that the number of the user terminals that can receive the broadcast-type service on the PtP channel is increased. Accordingly, the processing procedure shown in the FIGS. 4 and 5 is activated to determine whether a switching process from the PtM channel to the PtP channel is performed.

When one of the abovementioned conditions is satisfied to activate the processing procedure shown in FIGS. 4 and 5, the base station 201 or the base station control device 301 estimates the transmission power of the PtP channel required in the case where the content is distributed on the PtP channel to all the plurality of user terminals that receive the broadcast-type service on the PtM channel in the cell of the base station 201 and calculates the total (TTL_PtP) of the transmission power of all the PtP channels (step T1). The plurality of user terminals measure the reception power of the radio channel transmitted from the base station 201 to the user terminals and report the measurement result to the base station 201 or base station control device 301, and thereby the base station 201 or base station control device 301 can estimate the total of the transmission power of the PtP channel. The radio channel is the PtM channel that is being used for content distribution or a perch channel that the plurality of user terminals are receiving or the like. The notification of the measurement result from the plurality of user terminals may be performed passively (in response to the measurement request instruction sent from the base station 201 or base station control device 301) or voluntarily or periodically.

The base station 201 or base station control device 301 estimates the transmission power (Max_PtM) of the PtM channel that is being used for the content distribution to the plurality of user terminals (step T2). The base station 201 or base station control device 301 then compares the total (TTL_PtP) calculated in step T1 and the transmission power (Max_PtM) calculated in step T2 (step T3). When the total (TTL_PtP) is not less than the transmission power (Max_PtM) (No in step T3), the base station 201 or base station control device 301 determines that a switching process from the PtM channel to PtP channel need not be performed to end this flow and waits for a new start condition.

On the other hand, when the total (TTL_PtP) is less than the transmission power (Max_PtM) (Yes in step T3), the base station 201 or base station control device 301 determines to perform the switching process from PtM channel to PtP channel and estimates the power margin (Mgn_PW) in the cell of the base station 201 (step T4). The power margin (Mgn_PW) is a difference between the upper limit of the transmission power that the base station 201 can output to the cell and the total of the transmission power that the base station 201 outputs to all the user terminals (user terminals that receive the broadcast-type service in the cell and user terminals that receives the non-broadcast-type service in the cell) in the cell.

The base station 201 or base station control device 301 specifies the PtP channel (hereinafter, referred to as "first PtP channel") having the maximum power (Max_PtP) of the transmission powers of all the PtP channels estimated in step T1 (step T5). The first PtP channel having the maximum power (Max_PtP) may be specified after the transmission power of the PtP channel has been estimated again in step T5.

The base station 201 or base station control device 301 compares the power margin (Mgn_PW) and the estimated transmission power (Max_PtP) of the first PtP channel (step T6). When the power margin (Mgn_PW) is not less than the transmission power (Max_PtP) of the first PtP channel (Yes in step T6), a switching process from the PtM channel that is being used for the content distribution to the user terminal (hereinafter, referred to as "first user terminal") to the first PtP channel in such a manner not to interrupt the content reception operation in the first user terminal that is to receive the content on the first PtP channel of the plurality of user terminals (Step T7). In this channel switching process, after the first PtP channel is established while the PtM channel is maintained, the channel for distributing the content to the first user terminal is switched from the PtM channel to the established first PtP channel.

On the other hand, when the power margin (Mgn_PW) is less than the estimated transmission power (Max_PtP) of the first PtP channel (No in step T6), the base station 201 or base station control device 301 estimates the transmission power (2nd_PtM) of the PtM channel that reaches the user terminal (hereinafter referred to as "second user terminal") that is to receive the PtP channel (hereinafter referred to as "second PtP channel") having the second highest transmission power of the transmission powers of the PtP channels estimated in step T1 (step T8). The transmission power (2nd_PtM) of the PtM channel that reaches the second user terminal can be estimated based on the transmission power of the PtM channel that is being used for the content distribution to the plurality of user terminals and the reception power of the PtM channel or perch channel in the second user terminal.

The base station 201 or base station control device 301 compares a value obtained by adding the difference between the transmission power (Max_PtM) of the PtM channel that is being used for the content distribution to the plurality of user terminals and the transmission power (2nd_PtM) of the PtM channel that reaches the second user terminal to the power margin (Mgn_PW) with the transmission power (Max_PtP) of the first PtP channel (step T9).

When "Mgn_PW+(Max_PtM−2nd_PtM)≧Max_PtP" is satisfied (Yes in step T9), a channel switching process for the first user terminal is performed with interruption of content reception operation (step T10). In this channel switching process, the transmission power of the PtM channel that is being used for the content distribution to the plurality of user terminals is reduced such that the PtM channel cannot reach the first user terminal but can reach the second user terminal. After that, the first PtP channel is established, and the first user terminal receives the content on the established first PtP channel. Therefore, the content reception operation in the first user terminal is interrupted during the time period between the generation of PtM channel that reaches the second user terminal and the establishment of the first PtP channel.

When "Mgn_PW+(Max_PtM−2nd_PtM)<Max_PtP" is satisfied (No in step T9), a channel switching process for the plurality of user terminals that receive the broadcast-type service in the cell of the base station 201 is performed with interruption of content reception operation (step T11). In this channel switching process, after the transmission power of the PtM channel that is being used for the content distribution to the plurality of user terminals is reduced such that the PtM channel cannot reach the plurality of user terminals or PtM channel is canceled, the PtP channel is established between the plurality of user terminals and base station 201, with the result that the plurality of user terminals receive the content on the established PtP channel. It goes without saying that this channel switching process is performed such that the total of the downlink transmission power of the base station 201 does not exceed the upper limit of the transmission power that the base station 201 can output to the cell 100. When the channel switching process (step T11) is performed for all the user terminals that receive the broadcast-type service in the cell, the total of the downlink transmission power of the base station 201 does not exceed the upper limit during the channel switching process (step T11). The reason is that the total (TTL_PtP) calculated in step T1 is less than the transmission power (Max_PtM) calculated in step T2 (see step T3).

After the process in steps T7, T0, or T11 has been completed, the flow advances to step T12. The base station 201 or base station control device 301, which previously holds a target list in which all the user terminals that receive the broadcast-type service in the cell of the base station 201 are registered, deletes the user terminals whose reception channel has been switched to the PtP channel in the any of the above steps from the target list (step T12). The base station 201 or base station control device 301 then determines whether the user terminal whose reception channel needs to be switched to PtP channel exists or not based on the target list (step T13).

If the user terminal that receives the broadcast-type service on the PtM channel still exists (Yes in step T13), the base station 201 or base station control device 301 shifts to step T4. On the other hand, if all the user terminals that receive the broadcast-type service are receiving the content on the PtP channel (No in step T13), the base station 201 or base station control device 301 ends this flow and waits for a new start condition.

Only a part of the user terminals that receive the broadcast-type service in the cell may be registered in the above target list, not all the user terminals that receive the broadcast-type service in the cell. In this case, a mixed state of the PtP channel and PtM channel in the cell may arise temporary or constantly.

When the power margin (Mgn_PW) is less than the transmission power (Max_PtP) in step T6, it is determined, in step T9, which of the channel switching processes of steps T10 and step T11 is performed. However, the processes of steps T8 to T10 may be omitted. In this case, when the power margin (Mgn_PW) is less than the transmission power (Max_PtP) in step T6, the channel switching process (step T11) is performed.

When the total (TTL_PtP) is not less than the transmission power (Max_PtM) in step T3, it is determined that the channel switching process from the PtM channel to PtP channel need not be performed. However, even when the total (TTL_PtP) is not less than the transmission power (Max_PtM), it may be determined to perform the channel switching process depending on the security attribute of the content. For example, in the case where the content is paid content, the channel switching process from the PtM channel to PtP channel may be performed.

Next, detail of the channel switching process of step T7 (FIG. 5) will be described with reference to the drawings.

Figure 25:
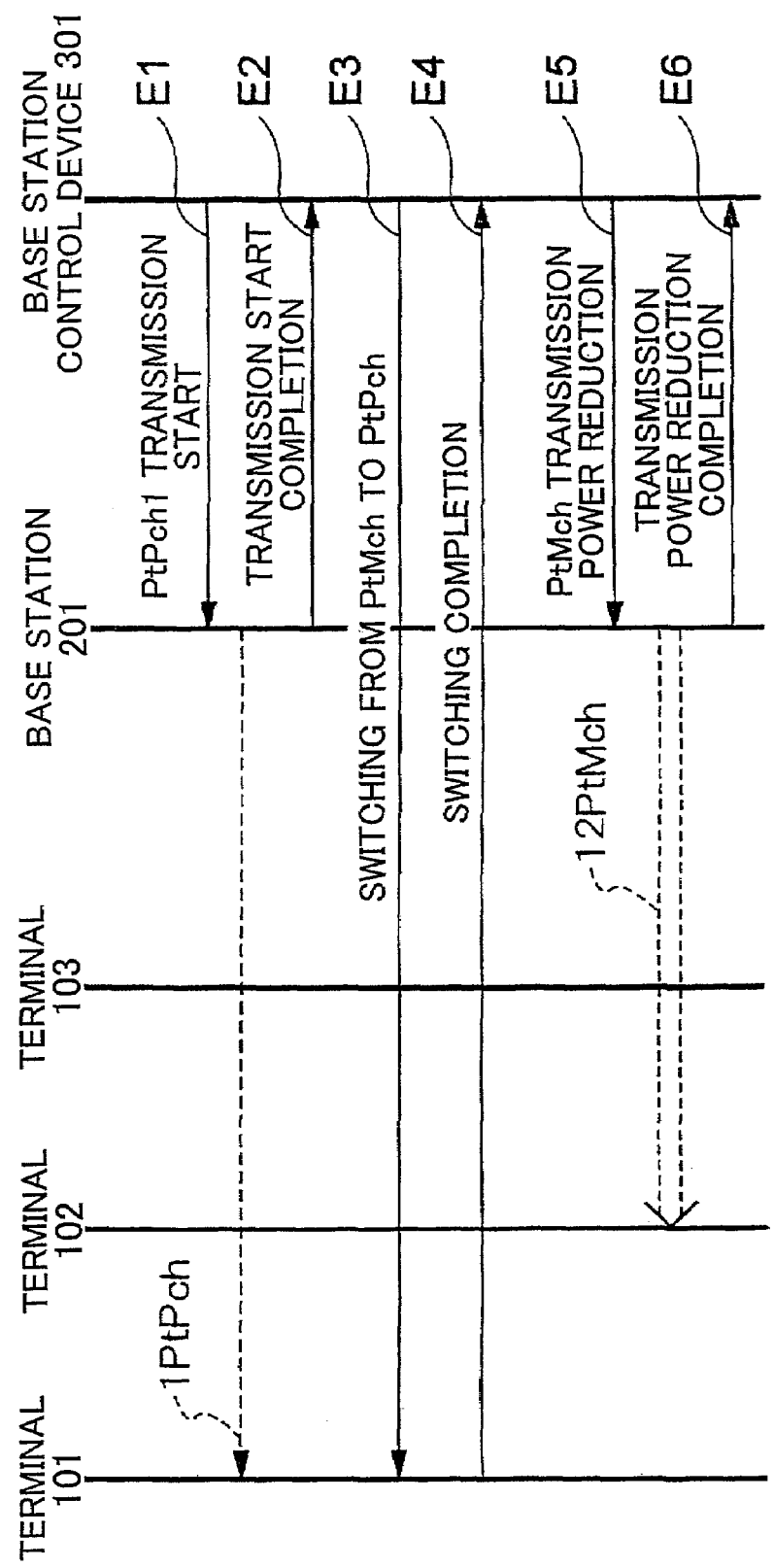
FIG. 25 is a sequence chart showing an operation of the mobile communication system according to the embodiment of the present invention in the case where the channel switching process (step T7) shown in FIG. 5 is performed under the condition shown in FIG. 12.

FIG. 25 is a sequence chart showing an operation in the case where the channel switching process of step T7 (FIG. 5) is performed under the condition shown in FIG. 12. When the channel switching process of step T7 (FIG. 5) is performed under the condition shown in FIG. 12, the base station control device 301 sends, to the base station 201, a transmission start message to allow the base station 201 to start the transmission of PtP channel 1 (see FIG. 11), as shown in FIG. 25 (step E1). Upon receiving the transmission start message, the base station 201 starts the transmission of the PtP channel 1 while maintaining the PtM channel 11 as shown in FIG. 11 and returns a transmission start completion message to the base station control device 301 (step E2).

Upon receiving the transmission start completion message, the base station control device 301 sends, to the user terminal 101, a switching instruction message for instructing the user terminal 101 to receive the content not on the PtM channel 11 but on the PtP channel 1 (step E3). Upon receiving the switching instruction message, the user terminal 101 starts an operation of receiving the content on the PtP channel 1 and returns a switching completion message to the base station control device 301 after confirming that the content can normally be received on the PtP channel 1 (step E4).

Upon receiving the switching completion message, the base station control device 301 sends, to the base station 201, a transmission power reduction message for reducing the transmission power of the PtM channel 11 such that the PtM channel 11 cannot reach the user terminal 101 but can reach the user terminal 102 (step E5). Upon receiving the transmission power reduction message, the base station 201 reduces the transmission power of the PtM channel 11. As a result, the PtM channel 12 that reaches the user terminal 102 is generated as shown in FIG. 10. After generating the PtM channel 12, the base station 201 returns a transmission power reduction completion message to the base station control device 301 (step E6). Thus, as shown in FIG. 10, the user terminal 101 receives the content on the PtP channel 1, and the user terminals 102 and 103 receive the content on the PtP channel 12.

Further, it is possible to perform the channel switching process of step T7 (FIG. 5) under the condition shown in FIG. 15. When the switching process of step T7 (FIG. 5) under the condition shown in FIG. 15 is performed, the base station 201 starts the transmission of the PtP channel 1 to the user terminal 101 while maintaining the PtM channel 10 and reduces the transmission power of the PtM channel 10 as shown in FIG. 10 after the user terminal 101 starts the content reception operation on the PtP channel 1 to generate the PtM channel 12.

Figure 26:
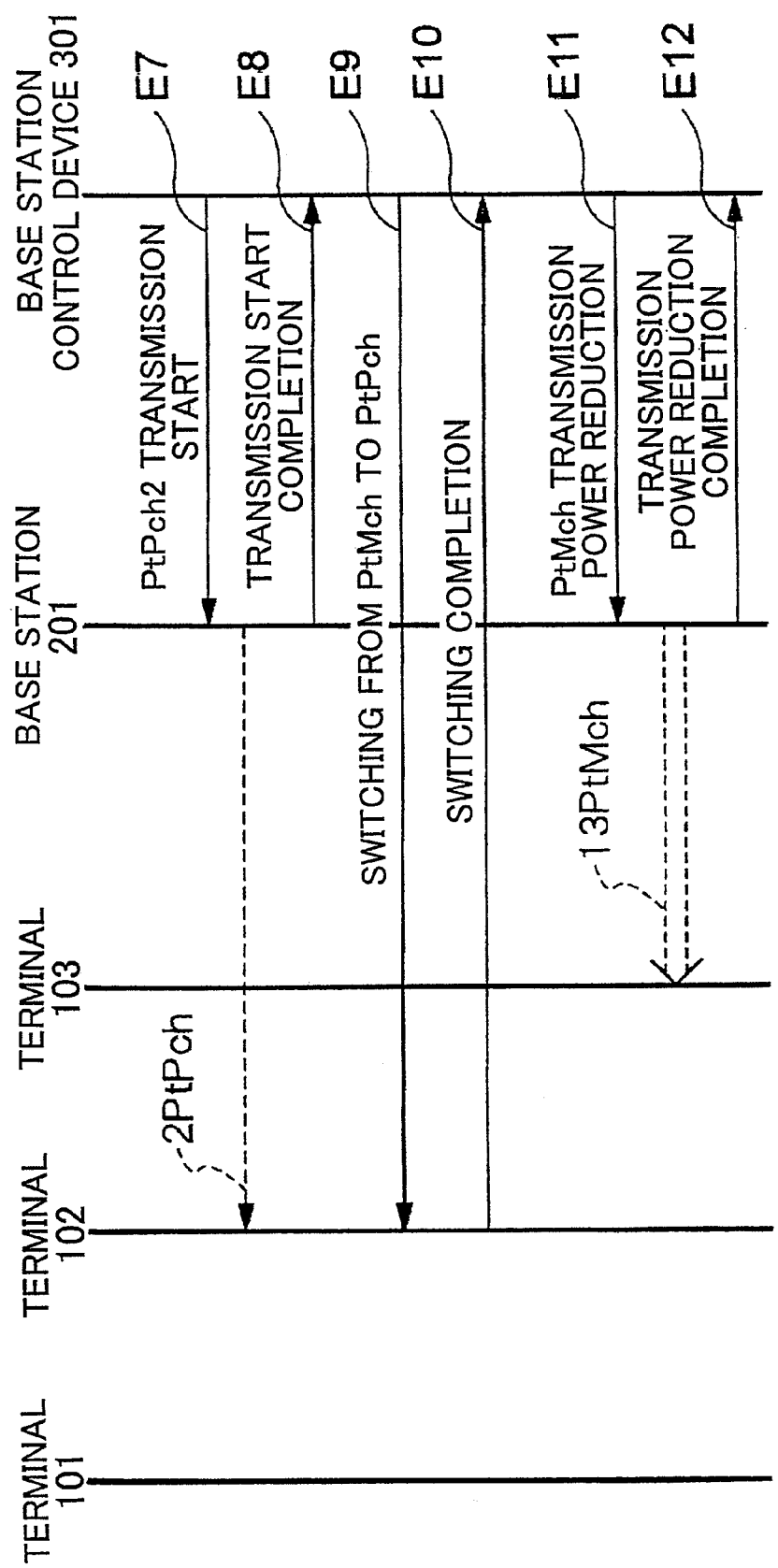
FIG. 26 is a sequence chart showing an operation of the mobile communication system according to the embodiment of the present invention in the case where the channel switching process (step T7) shown in FIG. 5 is performed under the condition shown in FIG. 10.

FIG. 26 is a sequence chart showing an operation in the case where the channel switching process of step T7 (FIG. 5) is performed under the condition shown in FIG. 10. When the channel switching process of step T7 (FIG. 5) is performed under the condition shown in FIG. 10, the base station control device 301 sends, to the base station 201, a transmission start message to allow the base station 201 to start the transmission of PtP channel 2 (see FIG. 9), as shown in FIG. 26 (step E7). Upon receiving the transmission start message, the base station 201 starts the transmission of the PtP channel 2 while maintaining the PtM channel 12 as shown in FIG. 9 and returns a transmission start completion message to the base station control device 301 (step E8).

Upon receiving the transmission start completion message, the base station control device 301 sends, to the user terminal 102, a switching instruction message for instructing the user terminal 102 to receive the content not on the PtM channel 12 but on the PtP channel 2 (step E9). Upon receiving the switching instruction message, the user terminal 102 starts an operation of receiving the content on the PtP channel 2 and returns a switching completion message to the base station control device 301 after confirming that the content can normally be received on the PtP channel 2 (step E10).

Upon receiving the switching completion message, the base station control device 301 sends, to the base station 201, a transmission power reduction message for reducing the transmission power of the PtM channel 12 such that the PtM channel 12 cannot reach the user terminal 102 but can reach the user terminal 103 (step E11). Upon receiving the transmission power reduction message, the base station 201 reduces the transmission power of the PtM channel 12. As a result, the PtM channel 13 that reaches the user terminal 103 is generated as shown in FIG. 8. After generating the PtM channel 13, the base station 201 returns a transmission power reduction completion message to the base station control device 301 (step E12). Thus, as shown in FIG. 8, the user terminals 101 and 102 receive the content on the PtP channels 1 and 2, and the user terminal 103 receives the content on the PtM channel 13.

Figure 27:
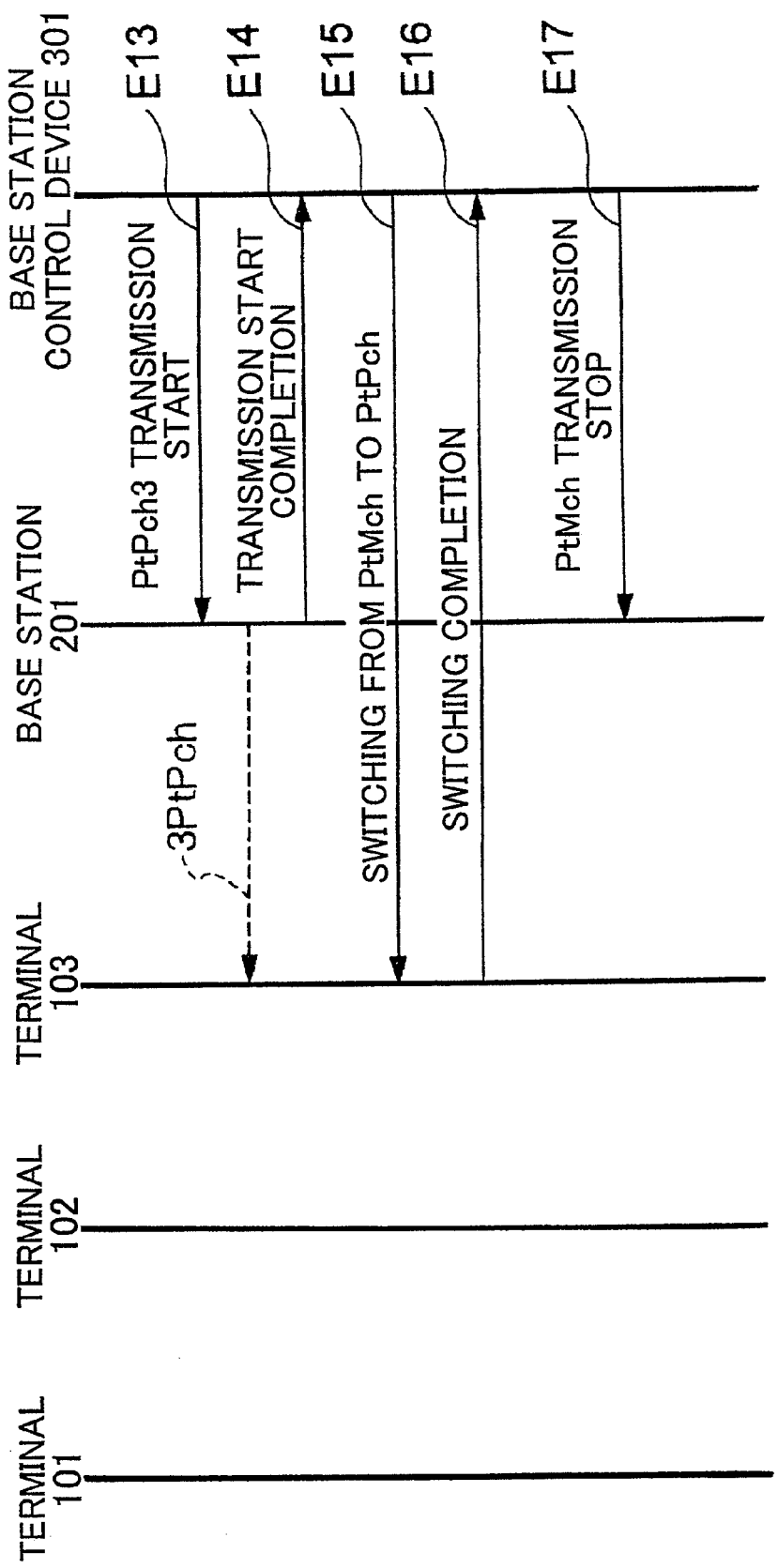
FIG. 27 is a sequence chart showing an operation of the mobile communication system according to the embodiment of the present invention in the case where the channel switching process (step T7) shown in FIG. 5 is performed under the condition shown in FIG. 8.

FIG. 27 is a sequence chart showing an operation in the case where the channel switching process of step T7 (FIG. 5) is performed under the condition shown in FIG. 8. When the channel switching process of step T7 (FIG. 5) is performed under the condition shown in FIG. 8, the base station control device 301 sends, to the base station 201, a transmission start message to allow the base station 201 to start the transmission of PtP channel 3 (see FIG. 7), as shown in FIG. 27 (step E13). Upon receiving the transmission start message, the base station 201 starts the transmission of the PtP channel 3 to the user terminal 3 while maintaining the PtM channel 13 as shown in FIG. 7 and returns a transmission start completion message to the base station control device 301 (step E14).

Upon receiving the transmission start completion message, the base station control device 301 sends, to the user terminal 103, a switching instruction message for instructing the user terminal 103 to receive the content not on the PtM channel 13 but on the PtP channel 3 (step E15). Upon receiving the switching instruction message, the user terminal 103 starts an operation of receiving the content on the PtP channel 3 and returns a switching completion message to the base station control device 301 after confirming that the content can normally be received on the PtP channel 3 (step E16).

Upon receiving the switching completion message, the base station control device 301 sends, to the base station 201, a transmission stop message for canceling the PtM channel 13 (step E17). Upon receiving the transmission stop message, the base station 201 stops the transmission of the PtM channel 13. Thus, as shown in FIG. 6, the user terminals 101 to 103 receive the content on the PtP channels 1 to 3.

As described above, when the radio channel to be used for the content distribution to the user terminals 101 to 103 is switched from the PtM channel 11 to the PtP channels 1 to 3, the actual transmission power of the PtP channels 1 to 3 may become more than the initially estimated transmission power (total (TTL_PtP) calculated in step T1 shown in FIG. 4). In this case, the radio channels may be switched back to the PtM channel 11.

In the channel switching process of step T7 (FIG. 5), the channel switching process to the PtP channel is performed for only one of the plurality of user terminals that receive the content on the PtM channel as described above. Alternatively, however, the radio channel of a plurality of user terminals may be switched to the PtP channel at a time. It goes without saying that the channel switching process of step T7 (FIG. 5) performed for a plurality of user terminals needs to be carried out such that the total of the downlink transmission power of the base station 201 does not exceed the upper limit while the PtP channel is transmitted to a plurality of user terminals with the plurality of PtM channels maintained.

A case where the channel switching process of step T7 (FIG. 5) is performed for the user terminals 101 and 102 under the condition shown in FIG. 12 will be described. This process is performed after comparing the total of the estimated transmission power of the PtP channels 1 and 2 with the margin power (Mgn_PW) in the cell 100 in step T6 of FIG. 5, and confirming that the total of the estimated transmission power of the PtP channels 1 and 2 is not more than the margin power (Mgn_PW).

When the channel switching process of step T7 (FIG. 5) is performed for the user terminals 101 and 102 under the condition shown in FIG. 12, the base station 201 starts the transmissions of the PtP channels 1 and 2 to the user terminals 101 and 102, respectively, while maintaining the PtM channel 11 and, after the user terminals 101 and 102 start receiving the content on the PtP channels 1 and 2, reduces the transmission power of the PtM channel 11 to generate the PtM channel 13 as shown in FIG. 8. Thus, as shown in FIG. 8, the user terminals 101 and 102 receive the content on the PtP channels 1 and 2, and the user terminal 103 receives the content on the PtM channel 13. It goes without saying that the abovementioned operation of the base station 201 is performed under the control of the base station control device 301.

A case where the channel switching process of step T7 (FIG. 5) is performed for the user terminals 101 to 103 under the condition shown in FIG. 12 will be described. This process is performed after comparing the total of the estimated transmission power of the PtP channels 1 to 3 with the margin power (Mgn_PW) in the cell 100 in step T6 of FIG. 5, and confirming that the total of the estimated transmission power of the PtP channels 1 to 3 is not more than the margin power (Mgn_PW).

When the channel switching process of step T7 (FIG. 5) is performed for the user terminals 101 to 103 under the condition shown in FIG. 12, the base station 201 starts the transmissions of the PtP channels 1 to 3 to the user terminals 101 to 103, respectively, while maintaining the PtM channel 11 as shown in FIG. 14 and, after the user terminals 101 to 103 start receiving the content on the PtP channels 1 to 3, stops the transmission of the PtM channel 11 as shown in FIG. 6. Thus, as shown in FIG. 6, the user terminals 101 to 103 receive the content on the PtP channels 1 to 3. It goes without saying that the abovementioned operation of the base station 201 is performed under the control of the base station control device 301.

Next, the details of the channel switching process of step T10 (FIG. 5) will be described with reference to the drawings.

Figure 28:
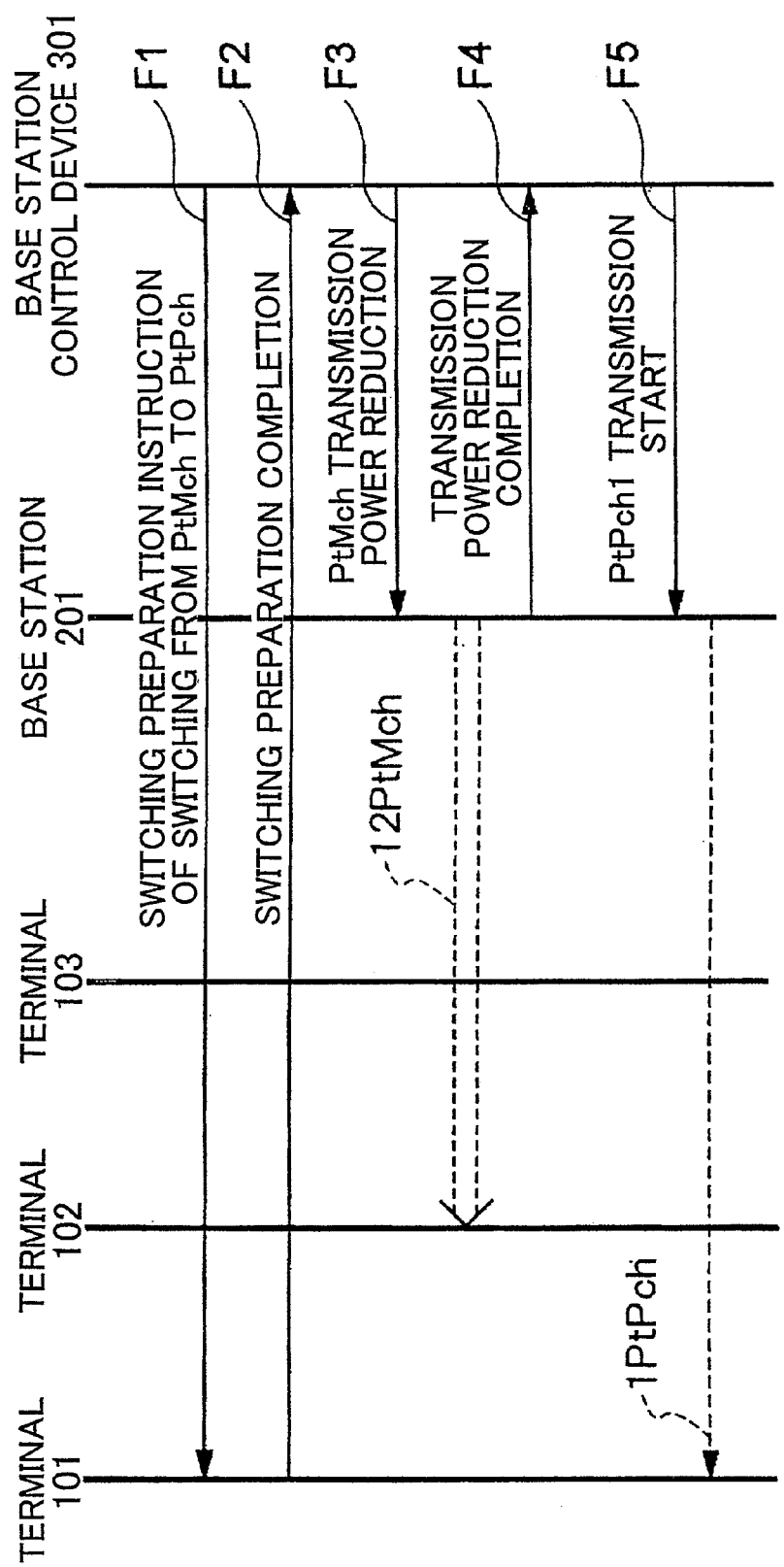
FIG. 28 is a sequence chart showing an operation of the mobile communication system according to the embodiment of the present invention in the case where the channel switching process (step T10) shown in FIG. 5 is performed under the condition shown in FIG. 12.

FIG. 28 is a sequence chart showing an operation in the case where the channel switching process of step T10 (FIG. 5) is performed under the condition shown in FIG. 12. When the channel switching process of step T10 (FIG. 5) is performed under the condition shown in FIG. 12, the base station control device 301 sends, to the user terminal 101, a switching preparation instruction message for instructing the user terminal 101 to cancel the content reception operation on the PtM channel 11 and to perform preparation of receiving the content on the PtP channel 1 (see FIG. 10), as shown in FIG. 28 (step F1). The switching preparation instruction message includes information related to time at which the PtP channel 1 can be received. Upon receiving the switching preparation instruction message, the user terminal 101 returns a switching preparation completion message to the base station control device 301 (step F2).

Upon receiving the switching preparation completion message, the base station control device 301 sends, to the base station 201, a transmission power reduction message for reducing the transmission power of the PtM channel 11 such that the PtM channel 11 cannot reach the user terminal 101 but can reach the user terminal 102 (step F3). Upon receiving the transmission power reduction message, the base station 201 reduces the transmission power of the PtM channel 11. As a result, the PtM channel 12 that reaches the user terminal 102 is generated. After generating the PtM channel 12, the base station 201 returns a transmission power reduction completion message to the base station control device 301 (step F4).

Upon receiving the transmission power reduction completion message, the base station control device 301 sends, to the base station 201, a transmission start message for allowing the base station 201 to start the transmission of PtP channel 1 (step F5). In response to the transmission start message, the base station 201 starts the transmission of the PtP channel 1 to the user terminal 101 as shown in FIG. 10. The user terminal 101 starts receiving the content on the PtP channel 1 at the time specified by the switching preparation instruction message. As a result, the user terminal 101 receives the content on the PtP channel 1, and the user terminals 102 and 103 receive the content on the PtM channel 12 as shown in FIG. 10.

Figure 29:
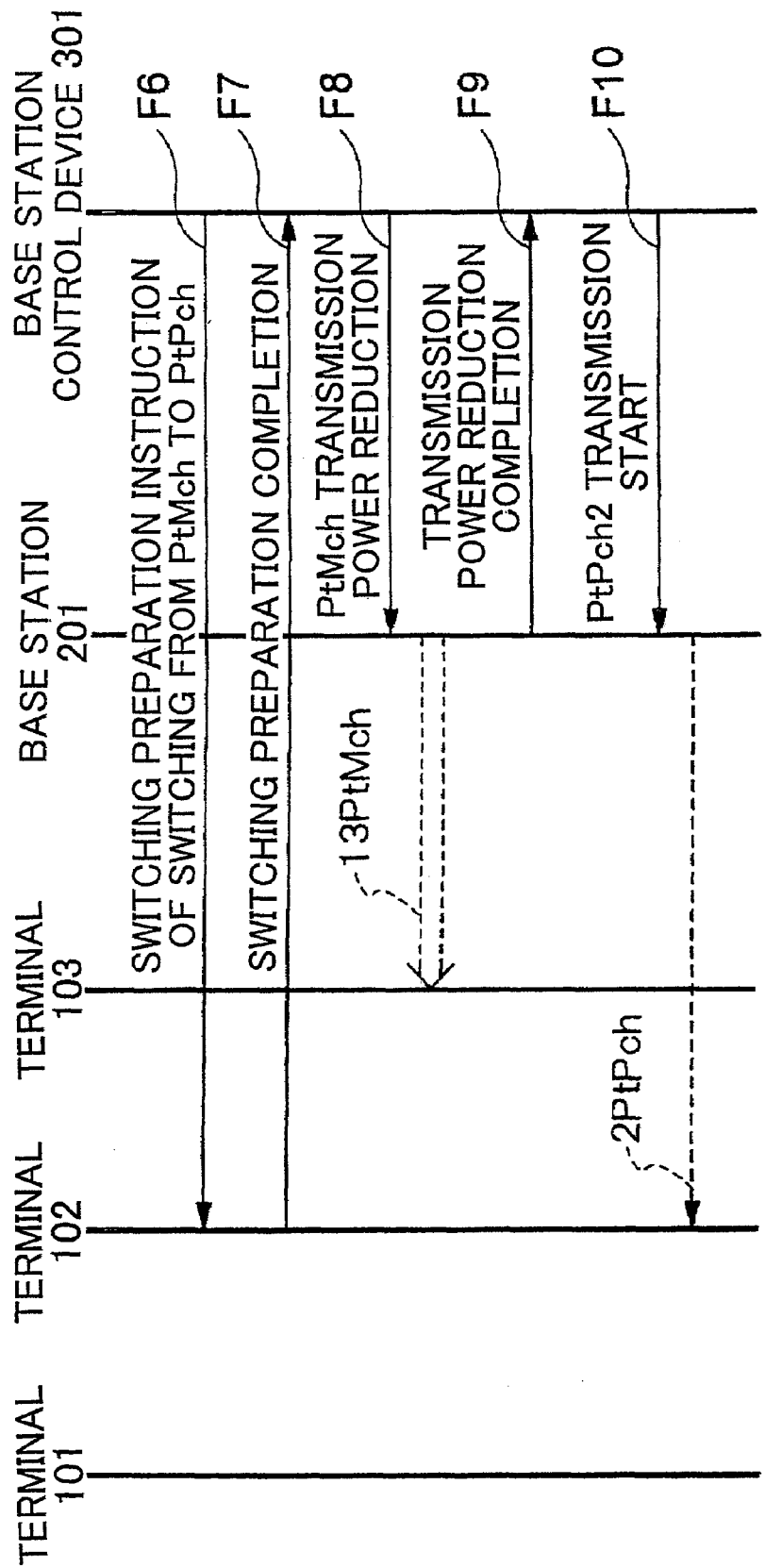
FIG. 29 is a sequence chart showing an operation of the mobile communication system according to the embodiment of the present invention in the case where the channel switching process (step T10) shown in FIG. 5 is performed under the condition shown in FIG. 10.

FIG. 29 is a sequence chart showing an operation in the case where the channel switching process of step T10 (FIG. 5) is performed under the condition shown in FIG. 10. When the channel switching process of step T10 (FIG. 5) is performed under the condition shown in FIG. 10, the base station control device 301 sends, to the user terminal 102, a switching preparation instruction message for instructing the user terminal 102 to cancel the content reception operation on the PtM channel 12 and to perform preparation of receiving the content on the PtP channel 2 (see FIG. 8), as shown in FIG. 29 (step F6). The switching preparation instruction message includes information related to time at which the PtP channel 2 can be received. Upon receiving the switching preparation instruction message, the user terminal 102 returns a switching preparation completion message to the base station control device 301 (step F7).

Upon receiving the switching preparation completion message, the base station control device 301 sends, to the base station 201, a transmission power reduction message for reducing the transmission power of the PtM channel 12 such that the PtM channel 12 cannot reach the user terminal 102 but can reach the user terminal 103 (step F8). Upon receiving the transmission power reduction message, the base station 201 reduces the transmission power of the PtM channel 12. As a result, the PtM channel 13 that reaches the user terminal 103 is generated. After generating the PtM channel 13, the base station 201 returns a transmission power reduction completion message to the base station control device 301 (step F9).

Upon receiving the transmission power reduction completion message, the base station control device 301 sends, to the base station 201, a transmission start message for allowing the base station 201 to start the transmission of PtP channel 2 (step F10). In response to the transmission start message, the base station 201 starts the transmission of the PtP channel 2 to the user terminal 102 as shown in FIG. 8. The user terminal 102 starts receiving the content on the PtP channel 2 at the time specified by the switching preparation instruction message. As a result, the user terminals 101 and 102 receive the content on the PtP channels 1 and 2, and the user terminal 103 receives the content on the PtM channel 13 as shown in FIG. 8.

FIG. 30 is a sequence chart showing an operation in the case where the channel switching process of step T10 (FIG. 5) is performed under the condition shown in FIG. 8. When the channel switching process of step T10 (FIG. 5) is performed under the condition shown in FIG. 8, the base station control device 301 sends, to the user terminal 103, a switching preparation instruction message for instructing the user terminal 103 to cancel the content reception operation on the PtM channel 13 and to perform preparation of receiving the content on the PtP channel 3 (see FIG. 6), as shown in FIG. 30 (step F11). The switching preparation instruction message includes information related to time at which the PtP channel 3 can be received.

Upon receiving the switching preparation instruction message, the user terminal 103 returns a switching preparation completion message to the base station control device 301 (step F12).

Upon receiving the switching preparation completion message, the base station control device 301 sends, to the base station 201, a transmission stop message for canceling the PtM channel 13 (step F13). Upon receiving the transmission stop message, the base station 201 stops the transmission of the PtM channel 13 and returns a transmission stop completion message to the base station control device 301 (step F14).

Upon receiving the transmission stop completion message, the base station control device 301 sends, to the base station 201, a transmission start message for allowing the base station 201 to start the transmission of PtP channel 3 (step F15). In response to the transmission start message, the base station 201 starts the transmission of the PtP channel 3 to the user terminal 103 as shown in FIG. 6. The user terminal 103 starts receiving the content on the PtP channel 3 at the time specified by the switching preparation instruction message. As a result, the user terminals 101 to 103 receive the content on the PtP channels 1 to 3 as shown in FIG. 6.

Next, the channel switching process of step T11 (FIG. 5) will be described.

When the radio channel used for the content distribution to the user terminals 101 and 102 is switched from the PtM channel 11 to the PtP channels 1 and 2 (see FIG. 8) at a time by the channel switching process of step T11 (FIG. 5) performed under the condition shown in FIG. 12, the base station 201 reduces the transmission power of the PtM channel 11 such that the PtM channel 11 cannot reach the user terminals 101 and 102 but can reach the user terminal 103. As a result, the PtM channel 13 that reaches the user terminal 103 is generated.

After that, the base station 201 starts the transmissions of the PtP channels 1 and 2 to the user terminals 101 and 102 as shown in FIG. 8. The user terminals 101 and 102 accordingly receive the PtP channels 1 and 2 as shown in FIG. 8. It goes without saying that the abovementioned operation of the base station 201 is performed under the control of the base station control device 301.

In the channel switching process of step T11 (FIG. 5) performed under the condition shown in FIG. 12, the radio channel used for the content distribution to the user terminals 101 to 103 may be switched from the PtM channel 11 to the PtP channels 1 to 3 (see FIG. 6) at a time. In this case, the base station 201 stops the transmission of the PtM channel 11, and starts the transmissions of the PtP channels 1 to 3 to the user terminals 101 to 103 as shown in FIG. 6. As a result, the user terminals 101 to 103 receive the content on the PtP channels 1 to 3 as shown in FIG. 6. It goes without saying that the abovementioned operation of the base station 201 is performed under the control of the base station control device 301.

As described above, in the respective channel switching processes of steps S7, S9, S10, T7, T10, and T11 shown in FIGS. 3 and 5, the type of the radio channel is switched under the control of the base station control device 301. That is, the base station control device 301 includes a channel switching control means for switching the radio channel type, by which the respective channel switching processes of steps S7, S9, S10, T7, T10, and T11 shown in FIGS. 3 and 5 are realized. Further, it has been determined whether the radio channel type is switched or not in the respective steps S3 and T3 shown in FIGS. 2 and 4. The determination may be made by the base station 201 or base station control device 301, as described above. That is, the base station 201 or base station control device 301 includes a channel switching determination means for determining whether to switch the radio channel type. The channel switching determination means determines whether to switch the radio channel type from a first channel to second channel different from the first channel based on the downlink transmission power of the first channel that is being used for the content distribution and the downlink transmission power of the second channel to be used for the content distribution.

The types of the content include the content whose distribution needs to be performed without interruption and content whose distribution might be performed with interruption. A movie or broadcasting image can be taken as an example of the content whose distribution needs to be performed without interruption. The content as described above is distributed in successive manner, and an interruption of the distribution causes discontent among users. Notification information that is distributed at a certain interval can be taken as the content whose distribution might be performed with interruption. The content as described above is distributed intermittently or repeatedly and, if its distribution is interrupted, the users can obtain the missing data again.

The respective channel switching processes of steps S9, S10, T10, and T11 shown in FIGS. 3 and 5 involve the interruption of content distribution as described above. However, it is not desirable to perform the channel switching process involving the interruption of content distribution in the case where the content to be distributed to the user terminals that receive the broadcast-type service is the content whose distribution needs to be performed without interruption. In this case, the channel switching process involving the interruption of content distribution may not be performed.

In order to allow the base station control device 301 to know whether content from the broadcast content server 501 is the content whose distribution needs to be performed without interruption, the broadcast content server 501 notifies the base station control device 301 of the attribute of the content, that is, whether or not the content is the content whose distribution needs to be performed without interruption at the time when the broadcast distribution of the content from the broadcast content server 501 is started, or while the broadcast distribution of the content is being performed. With the above configuration, the base station control device 301 can determine whether to perform the channel switching process involving the interruption of content distribution.

Figure 31A:
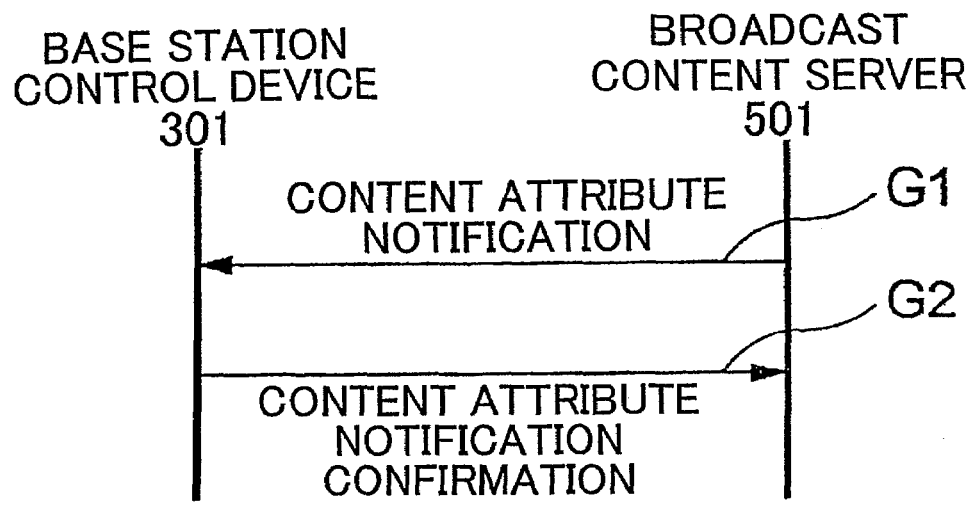
FIGS. 31A and 31B are sequence charts each showing an operation of the mobile communication system according to the embodiment of the present invention in the case where a content attribute notification process and content attribute changeover process between a base station control device and broadcast content server.
Figure 31B:
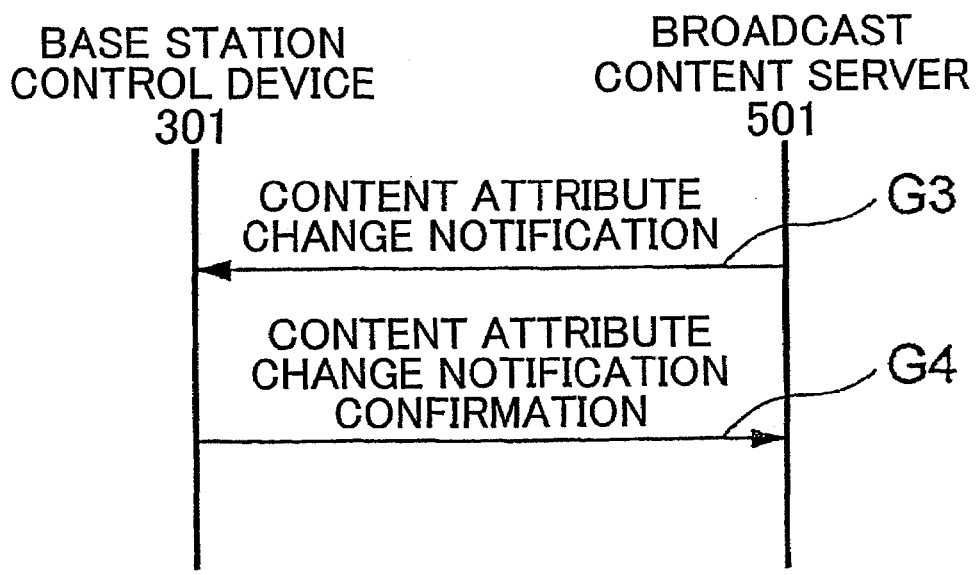

FIG. 31 shows an operation in which the broadcast content server 501 notifies the base station control device 301 of the attribute of the content. FIG. 31A is a sequence chart showing an operation of notifying of the content attribute at the time when the content distribution is started, and FIG. 31B is a sequence chart showing an operation of notifying of the content attribute or a change of the content attribute while the content distribution is being performed.

In FIG. 31A, the broadcast content server 501 sends a content attribute notification message for notifying of the content attribute at the time when the content distribution is started (step G1). The base station control device 301 then sends a content attribute notification confirmation message to the broadcast content server 501 to notify the content server 501 that the base station control device 301 has received the notification related to the content attribute (step G2). In FIG. 31B, the broadcast content server 501 sends a content attribute change notification message for notifying of the content attribute or a change of the content attribute while the content distribution is being performed (step G3). The base station control device 301 then sends a content attribute change notification confirmation message to the broadcast content server 501 to notify the content server 501 that the base station control device 301 has received the notification related to the content attribute (step G4).

The present invention is not limited to the above representative embodiment and those skilled in the art can make variations and modifications without deviating from the broad principles and spirit of the present invention based on claims of the present invention. The invention obtained by the above variation and modification belongs to the scope of the present invention. For example, although the channel switching control means and channel switching control method in the mobile communication system are realized by a program control in the above embodiment, a software configuration and hardware configuration can be employed as far as they can realize the functions described in claims of the present invention. For example, a part or all of the above program control may be constituted by other logical circuits.

INDUSTRIAL APPLICABILITY

As described above, the present invention is suitably applied to the mobile communication system in which the type of a radio channel used for the content distribution needs to be switched.

The invention claimed is:

1. A content distribution system comprising:
a base station which utilizes at least one communication channel to distribute communication data content between the base station and at least one mobile station, wherein the communication channel comprises:
an individual communication channel, and
a common communication channel;
the base station comprising channel determination means which determines the at least one communication channel to be used based on a downlink transmission power of the communication data content to the at least one mobile station, and
the channel determination means switches the individual communication channel to the common communication channel when a downlink transmission power of the common communication channel is less than a downlink transmission power of the individual communication channel.

2. A content distribution system comprising:
a base station which utilizes at least one communication channel to distribute data content between the base station and at least one mobile station, the communication channel including an individual communication channel and a common communication channel, wherein the base station comprises channel determination means which determines the at least one communication channel based on a downlink transmission power; and
the channel determination means switches the common communication channel to the individual communication channel when a downlink transmission power of the individual communication channel is less than a downlink transmission power of the common communication channel.

3. A content distribution system comprising:
a base station which utilizes at least one communication channel to distribute data content between the base station and at least one mobile station, the at least one communication channel including an individual communication channel and a common communication channel, wherein the base station comprises channel determination means which determines the at least one communication channel based on a transmission power; and
the channel determination means switches the individual communication channel to the common communication channel, without interruption of the data content distributed to a mobile station having a minimum individual communication channel transmission power among a plurality of mobile stations using the individual communication channel, when a common communication channel transmission power necessary for the mobile station is less than a power margin in a cell of the base station.

4. The content distribution system according to claim 3, wherein the at least one communication channel of the at least one mobile station using the individual communication channel is switched to the common communication channel without interruption of the data content.

5. A content distribution system comprising:
a base station which utilizes at least one communication channel to distribute data content between the base station and at least one mobile station, the communication channel including an individual communication channel and a common communication channel, wherein the base station comprises channel determination means which determines the at least one communication channel based on a transmission power; and
the channel determination means switches the individual communication channel to the common communication channel, with interruption of the data content distributed to a mobile station having a minimum individual communication channel transmission power among a plurality of mobile stations using the individual communication channel, when a common communication channel transmission power necessary for the mobile station is greater than a power margin in a cell of the base station.

6. The content distribution system according to claim 5, wherein the at least one communication channel of the at least one mobile station using the individual communication channel is cancelled and then switched to the common communication channel with interruption of the data content, when the at least one communication channel is switched from the individual communication channel to the common communication channel.

7. A content distribution system comprising:
a base station which utilizes at least one communication channel to distribute data content between the base station and at least one mobile station, the communication channel including an individual communication channel and a common communication channel, wherein the base station comprises channel determination means which determines the at least one communication channel based on a transmission power; and
the channel determination means switches the common communication channel to the individual communication channel, without interruption of the data content distributed to a mobile station having a minimum individual channel transmission power among a plurality of mobile stations using the individual channel, when a total power of an individual communication channel transmission power necessary for the plurality of mobile stations currently using the common communication channel, is less than the common communication channel transmission power, and a maximum individual communication channel transmission power among the plurality of mobile stations using the individual channel is less than a power margin in a cell of the base station.

8. The content distribution system according to claim 7, wherein the at least one communication channel of the at least one mobile station using the common communication channel is switched to the individual communication channel without interruption of the data content.

9. A content distribution system comprising:
the base station which utilizes at least one communication channel to distribute data content between the base station and at least one mobile station, the at least one communication channel including an individual communication channel and a common communication channel, wherein the base station comprises channel determination means which determines the at least one communication channel based on a transmission power; and a channel determination means switches the common communication channel to the individual communication channel, with interruption of the data content distributed to a mobile station having a minimum individual channel transmission power among a plurality of mobile stations using the individual channel, when a total power of an individual communication channel transmission power necessary for the plurality of mobile stations currently using the common communication channel is less than the common communication channel transmission power, and a maximum individual communication channel transmission power among the plurality of mobile stations using the individual channel is greater than a power margin in a cell of the base station.

10. The content distribution system according to claim 9, wherein the at least one communication channel of the at least one mobile station using the common communication channel is cancelled and then switched to the individual communication channel with interruption of the data content, when the at least one communication channel is switched from the common communication channel to the individual communication channel.

11. A content distribution system comprising:
a base station which utilizes at least one communication channel to distribute data content between the base station and at least one mobile station, the at least one communication channel including an individual communication channel and a common communication channel, wherein the base station comprises channel determination means which determines the at least one communication channel based on a transmission power;
the channel determination means obtains a content attribute notifying whether distribution of the data content may be performed with interruption; and
the channel determination means determines the at least one communication channel based on the content attribute.

12. The content distribution system according to claim 11, wherein the channel determination means obtains the content attribute by receiving a content attribute notification message from a broadcast content server before the content data is distributed.

13. The content distribution system according to claim 11, wherein the channel determination means obtains the content attribute by receiving a content attribute notification message from a broadcast content server while receiving the content data.

14. A channel determination method of a content distribution system comprising:
utilizing at least one communication channel to distribute data content between a base station and at least one mobile station, the at least one communication channel including an individual communication channel and a common communication channel;
determining the at least one communication channel based on a transmission power; and
switching the common communication channel to the individual communication channel when a downlink transmission power of the individual communication channel is less than a downlink transmission power of the common communication channel.

15. A channel determination method of a content distribution system comprising:
utilizing at least one communication channel to distribute data content between a base station and at least one mobile station, the at least one communication channel including an individual communication channel and a common communication channel;

determining the at least one communication channel based on a transmission power; and switching the individual communication channel to the common communication channel, without interruption of the data content distributed to a mobile station having a minimum individual channel transmission power among a plurality of mobile stations using the individual channel, when a common communication channel transmission power necessary for the mobile station is less than a power margin in a cell of the base station.

16. The channel determination method according to claim 15, wherein the at least one communication channel of the at least one mobile station using the individual communication channel is switched to the common communication channel without interruption of the data content.

17. A channel determination method of a content distribution system comprising:

utilizing at least one communication channel to distribute data content between a base station and at least one mobile station, the at least one communication channel including an individual communication channel and a common communication channel;

determining the at least one communication channel based on a transmission power; and switching the individual communication channel to the common communication channel, with interruption of the data content distributed to a mobile station, having a minimum individual channel transmission power among a plurality of mobile stations using the individual channel, when a common communication channel transmission power necessary for the mobile station is greater than a power margin in a cell of the base station.

18. The channel determination method according to claim 17, wherein the at least one communication channel of the at least one mobile station using the individual communication channel is cancelled and then switched to the common communication channel with interruption of the data content, when the at least one communication channel is switched from the individual communication channel to the common communication channel.

19. A channel determination method of a content distribution system comprising:

utilizing at least one communication channel to distribute data content between a base station and at least one mobile station, the at least one communication channel including an individual communication channel and a common communication channel;

determining the at least one communication channel based on a transmission power; and switching the common communication channel to the individual communication channel, without interruption of the data content distributed to a mobile station having a minimum individual channel transmission power among a plurality of mobile stations using the individual channel, when a total power of an individual communication channel transmission power necessary for a plurality of mobile stations currently using the common communication channel is less than the common communication channel transmission power, and a maximum individual communication channel transmission power among the plurality of mobile stations using the individual channel is less than a power margin in a cell of the base station.

20. The channel determination method according to claim 19, wherein the at least one communication channel of the at least one mobile station using the common communication channel is switched to the individual communication channel without interruption of the data content.

21. A channel determination method of a content distribution system comprising:

utilizing at least one communication channel to distribute data content between a base station and at least one mobile station, the at least one communication channel including an individual communication channel and a common communication channel;

determining the at least one communication channel based on a transmission power; and switching the common communication channel to the individual communication channel, with interruption of the data content distributed to a mobile station having a minimum individual communication channel transmission power among a plurality of mobile stations using the individual communication channel, when a total power of an individual communication channel transmission power necessary for the plurality of mobile stations currently using the common communication channel is less than the common communication channel transmission power, and a maximum individual communication channel transmission power among the plurality of mobile stations using the individual communication channel is greater than a power margin in a cell of the base station.

22. The channel determination method according to claim 21, wherein the at least one communication channel of the at least one mobile station using the common communication channel is cancelled and then switched to the individual communication channel with interruption of the data content, when the at least one communication channel is switched from the common communication channel to the individual communication channel.

23. A channel determination method of a content distribution system comprising:

utilizing at least one communication channel to distribute data content between a base station and at least one mobile station, the at least one communication channel including an individual communication channel and a common communication channel;

determining the at least one communication channel based on a transmission power;

obtaining a content attribute notifying whether distribution of the data content may be performed with interruption; and determining the at least one communication channel based on the content attribute.

24. The channel determination method according to claim 23, further comprising obtaining the content attribute by receiving a content attribute notification message from a broadcast content server before the content data is distributed.

25. The channel determination method according to claim 23, further comprising obtaining the content attribute by receiving a content attribute notification message from a broadcast content server while receiving the content data.

* * * * *